United States Patent [19] [11] 4,113,318
Doi [45] Sep. 12, 1978

[54] LOAD-RESPONSIVE PRESSURE PROPORTIONING REDUCING VALVE ASSEMBLY FOR VEHICLE HYDRAULIC BRAKE SYSTEM

[75] Inventor: Kaname Doi, Ibaraki, Japan

[73] Assignee: Sumitomo Electric Industries, Ltd., Osaka, Japan

[21] Appl. No.: 804,572

[22] Filed: Jun. 8, 1977

[30] Foreign Application Priority Data

Jun. 11, 1976 [JP] Japan .................................. 51-68878

[51] Int. Cl.² .............................................. B60T 8/14
[52] U.S. Cl. .................................. 303/24 F; 188/349; 303/6 C
[58] Field of Search ............... 137/38; 303/6 C, 22 R, 303/24 A, 24 C, 24 F, 84 A; 188/195, 349

[56] References Cited

U.S. PATENT DOCUMENTS

| | | | |
|---|---|---|---|
| 3,317,251 | 5/1967 | Hambling et al. ................... | 303/24 A |
| 3,383,139 | 5/1968 | Chevreux ........................... | 303/24 A |
| 3,385,308 | 5/1968 | Farr ..................................... | 137/38 |
| 3,967,861 | 7/1976 | Nagara ............................ | 303/22 R X |
| 3,975,062 | 8/1976 | Giordano et al. .............. | 303/24 C X |
| 4,036,535 | 7/1977 | Katoh .............................. | 303/24 C X |

Primary Examiner—Stephen G. Kunin
Attorney, Agent, or Firm—Carothers and Carothers

[57] ABSTRACT

A load-responsive pressure reducing valve assembly for hydraulic brake systems to be interposed between a brake master cylinder and the rear wheel brake cylinders of a wheeled vehicle. The valve assembly includes a fluid pressure proportioning valve which restricts the flow of fluid from the master cylinder to the brake slave cylinders during a predetermined range of increasing fluid pressure supplied therefrom to the brake slave cylinders. The valve assembly also includes a deceleration sensing valve having a spherical inertia-responsive member that is responsive to a predetermined rate of vehicle deceleration to travel a predetermined distance up an incline to close off the supply of hydraulic fluid to a control chamber wherein the fluid pressure acts on a portion of the aforesaid proportioning valve, thus setting the reduction starting pressure of the fluid pressure proportioning valve. A deceleration control is provided in the valve assembly and is responsive to a predetermined range of increasing hydraulic fluid pressure supplied from the vehicle brake master cylinder to steepen or increase the angle of inclination of the incline to optimize the front and rear wheel braking power distribution in correspondence with the load shift which occurs as a result of the vehicle braking operation under any given load condition on the vehicle.

18 Claims, 11 Drawing Figures

LOAD-RESPONSIVE PRESSURE PROPORTIONING REDUCING VALVE ASSEMBLY FOR VEHICLE HYDRAULIC BRAKE SYSTEM

BACKGROUND OF THE INVENTION

1. Field of the Invention

The present invention relates generally to hydraulic braking systems of motor vehicles and, more particularly, to fluid pressure regulating devices to be incorporated in such braking systems.

More particularly, this invention relates to load-responsive pressure proportioning reducing valve assemblies which distribute the hydraulic brake pressure, corresponding to a transient weight transfer from rear wheels of the vehicle to the front wheels caused by the braking operation, by varying the starting pressure for brake fluid pressure reduction supplied to the rear brakes in response to load and deceleration conditions of the vehicle.

2. Discussion of the Prior Art

With regard to wheeled vehicles which have brake systems with front wheel brakes and rear wheel brakes, it is well known that when the vehicle is subjected to braking operations, a load shift phenomenon occurs wherein the share of the vehicle load borne by the front wheels under normal unbraked conditions dynamically increases and the share of the load borne by the rear wheels decreases. This is due to inertia forces which are proportionate to the amount of deceleration of the vehicle produced by the braking operation. In consequence of this phenomenon, the braking ability of the front wheels thus increases and the braking ability of the rear wheels decreases.

In order to correct this condition and prevent locking of the rear wheels with brake application, it is desirable to either increase the hydraulic pressure supplied to the front wheel brakes in proportion to the deceleration of the vehicle while the hydraulic fluid pressure generated in the master cylinder is being supplied directly to the rear wheel brakes, or to reduce the hydraulic pressure supplied to the rear wheel brakes in proportion to the deceleration of the vehicle while the hydraulic fluid pressure generated in the master cylinder is supplied directly the front wheel brakes. The present invention relates to the latter type of pressure proportioning systems.

A number of different techniques and structures have been developed over the years to reduce the hydraulic pressure being supplied to the rear wheel brakes in proportion to the deceleration of the vehicle. Some of these prior art devices provide effective braking power distribution corresponding to various degrees of deceleration of the vehicle, but only under one given condition of vehicle load. It is desirable to obtain effective distribution of front and rear wheel braking power to prevent premature locking of the rear wheels at such time that excessive braking occurs over an entire range of possible different vehicle load conditions to thereby prevent the occurrence of vehicle spinning.

For commercial vehicles such as trucks and the like, which are subjected to large variations in load conditions, it is common to incorporate into the proportioning reducing valve assembly a device which indirectly senses the weight of the vehicle load or the total weight of the loaded vehicle and correspondingly suppresses the hydraulic pressure supplied from the proportioning reducing valve to the vehicle rear brakes. These devices increase the level of hydraulic pressure required to start the pressure reducing operation of the reducing valve in proportion to the vehicle load to provide effective front and rear wheel braking power distribution which corresponds respectively to various decelerations caused by braking operations under any various given weight conditions.

Many of the older devices utilized for indirectly sensing the vehicle load use the technique of automatically detecting the share of load borne by the rear wheels of the vehicle. These systems have been considered undesirable, as their construction is such that they are subject to installation errors which may create large errors in detecting the vehicle load as a very high precision is demanded for attaining the proper installation load of the control spring used in these reducing valves. In addition, large physical differences in the type and model of vehicles manufactured make it very difficult for universal installation of this type of vehicle load detection device, thereby further increasing the change of error.

Also, these devices generally have linking mechanisms which are undesirably exposed to the exterior elements causing eventual functional deterioration. In addition, difficult adjustments must be made to these systems at the time of installation, and these systems tend to be sensitive to the unevenness or roughness of the road surface.

In contrast to the aforementioned systems for detecting vehicle load conditions, a more preferable technique is the deceleration sensing type load-responsive valve. Valves of this type are constructed such that the hydraulic pressure level selected to start the pressure reduction operation of the proportioning valve is accomplished by sensing a specific deceleration of the vehicle. In most of these devices, a specific deceleration value under unloaded conditions is detected. This type of load-responsive reducing valve assembly is generally designated as the fixed deceleration sensing type. It detects a fixed or specific deceleration value irrespective of the vehicle load condition. A heavier vehicle load condition will require a greater applied hydraulic brake pressure to attain the specific deceleration value than would be the case with unloaded vehicle conditions thereby producing front and rear wheel braking power distribution which is adapted to the condition of load on the vehicle.

Other deceleration sensing type load-responsive reducing valves are of the variable deceleration sensing type which sense the specific deceleration of the vehicle as determined by the various conditions of load on the vehicle respectively. The pressure reducing valve assembly of the present invention relates to the variable deceleration detection type. The most novel systems of this type as presently existing in the prior art are constructed such that the specific hydraulic pressure which is detected by the action of the deceleration sensing means is caused to act directly itself on one end of the pressure proportioning valve to accordingly vary the starting pressure of the pressure proportioning reduction operation of the reducing valve.

In this type of valve assembly, a deceleration control means or device is utilized for the purpose of controlling the action of the deceleration sensing device. The deceleration sensing device generally consists of a spherical member which travels up an incline to block the passage of hydraulic fluid, in excess of a detected level, into the control chamber wherein the fluid under pressure biases the proportioning valve to set the reduction starting pressure. A differential piston is utilized as the device to control the deceleration sensing means. This differential piston has two slightly different effective pressure receiving areas which oppose each other and are made of liquid sealing members which are formed of a high molecular elastic material.

This deceleration control means responds to a predetermined level of hydraulic pressure supplied to the valve assembly from the master cylinder and accordingly in turn controls the operation of the deceleration sensing device. This deceleration control means must respond quickly to a change in hydraulic pressure acting on the two effective pressure receiving areas thereof and thereby accurately control the actuation point of the deceleration sensing means. However, this pressure sensing deceleration control means, because of the aforesaid two liquid sealing members, has a disadvantage in that an increase in the sliding resistance is induced as the level of hydraulic pressure acting thereon increases. This, in turn, attenuates the speed of operation of the deceleration control means such that the deceleration sensing means may thus sense a deceleration lower than the actual vehicle deceleration.

The pressure proportioning reducing valve of the present invention relates to a novel variable deceleration sensing type valve which is void of these disadvantages by the provision of a pressure sensing deceleration control means which is made up of only one liquid sealing member of a high molecular elastic material.

SUMMARY OF THE INVENTION

The load-responsive pressure proportioning valve of the present invention is adapted to be interposed between a brake fluid motor (master cylinder) and at least one wheel brake cylinder in the hydraulic brake system of a wheeled vehicle. The valve assembly includes a pressure proportioning valve for restricting the flow of fluid from a fluid inlet leading from the master cylinder to a fluid outlet leading to the aforesaid brake cylinder during a predetermined range of increasing fluid pressure at the outlet. The valve assembly also incorporates a deceleration sensing means or device which includes an inertia-responsive member, such as a spherical member, responsive to a predetermined rate of deceleration of the vehicle to travel a predetermined distance up an incline or inclined surface, thereby causing the deceleration sensing means to set the starting pressure of the aforesaid predetermined range of increasing fluid pressure, i.e., set the pressure at which the pressure proportioning or reducing operation will commence. The primary improvement resides in a deceleration control means for increasing the sensed deceleration during a predetermined range of increasing fluid pressure from the valve assembly inlet supplied by the master cylinder.

The deceleration control means includes a piston which is displaceable with the application of fluid under pressure supplied from the inlet and which is of at least a predetermined level, to thereby act on the inertia-responsive member to vary or increase the predetermined deceleration to be detected or sensed. The effective pressure receiving area of this control piston which is subjected to the fluid of predetermined pressure, is slidably received in a sealing member of high molecular elastic material so that no other areas of the piston which would oppose the said effective area are subjected to the fluid of predetermined pressure; i.e., the piston is not a differential piston.

In the preferred embodiment, the deceleration control means acts on the inertia-responsive member by increasing the angle of inclination of the aforesaid incline, up which the inertia-responsive member must move the predetermined distance, during a predetermined range of increasing fluid pressure supplied from the valve assembly inlet. The inertia-responsive member is generally a ball or spherical member.

This deceleration control for increasing the angle of inclination of the incline up which the inertia ball or member must travel is accomplished by providing means to pivot the incline about a pivot point during the aforesaid predetermined range of increasing fluid pressure supplied to the inlet. This means to pivot the incline generally includes a cage which provides the inclined surface therein such that the inertia member or ball is received within the cage with the inertia member resting on the bottom thereof which forms the incline. The cage (usually the entire valve assembly) is installed on an angle of inclination $\theta$. The inertia-responsive member longitudinally moves in the cage, up the incline in the direction of travel of the vehicle, from a stop at the bottom of the cage, for the predetermined distance in response to predetermined vehicle deceleration. This cage is pivoted about an axis which is horizontally transverse to the incline.

The aforesaid piston acts as a cage position controller means and supports the cage at the aforesaid angle of inclination. This controller means is displaceable by the aforesaid predetermined range of increasing fluid pressure from the inlet to pivot or permit the pivoting of the cage to an angle of steeper inclination.

This piston supports the cage from downward pivotal movement about its pivotal axis. However, this piston is displaceable against its bias by fluid under pressure within the aforesaid predetermined range of pressure supplied from the fluid inlet of the valve assembly to pivot the cage to an angle of steeper inclination.

The cage position controller means may also be assisted by or include a holding means which continually urges the cage into following support engagement with the piston of the position controller means to insure that the cage properly follows the action of the piston of the position controller means, thereby preventing interference with proper action of the valve assembly due to road vibration and the like.

The inertia-responsive member in the valve assembly is, as indicated, preferably a spherical body which rolls up the incline through the predetermined distance due to the application of the required deceleration of the vehicle to seat on an annular valve seat thereby closing a fluid supply orifice to a control chamber wherein the fluid acts directly on the pressure proportioning valve to normally delay the pressure proportioning operation. When this fluid orifice is closed, the starting pressure of the pressure proportioning or reducing operation is thereby set or fixed and upon application of additional fluid pressure to the valve assembly inlet, the pressure reducing operation is initiated.

The pivot axis of the cage which holds the inertia-responsive member is positioned such that it passes through the center of the spherical inertia-responsive member when this spherical member is engaged with the annular valve seat. This maintains and insures proper seating of the spherical member in the annular valve seat no matter how the angle of inclination of the incline varies due to pivotal movement of the cage about its pivot axis.

Another object and advantage of the present invention resides in the provision of a restriction orifice in the fluid passage leading from the valve assembly inlet or first chamber housing the proportioning valve, which supplies fluid to the deceleration control means. The fluid flow through the orifice is restricted such that the rate of increase of hydraulic pressure established in the chamber housing the deceleration control means is delayed in proportion to the rate of increase of hydraulic pressure supplied to the inlet and the chamber supplying the proportioning valve. Under slow braking operations, no significant delay in pressure build-up is experienced in the chamber housing the deceleration control means. However, under hard braking applications, the orifice delays operation of the position controller means to compensate for brake time lag which conventionally occurs in proportion to the increase between the supply of hydraulic pressure to the brake and the generation of deceleration to be induced by that hydraulic pressure when the speed of the braking operation increases.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENTS

Figure 1:
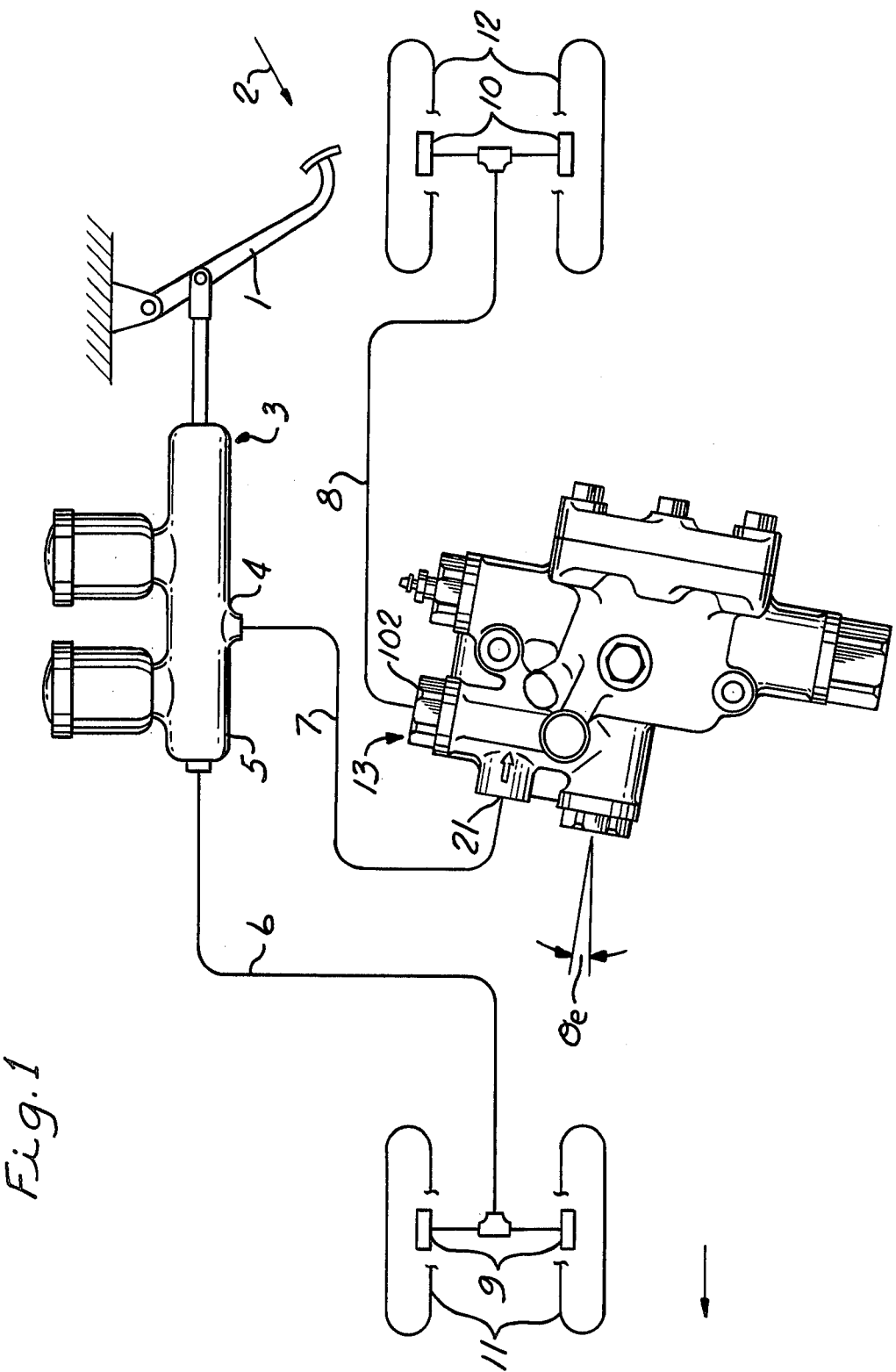
FIG. 1 is a schematic diagram of a vehicle braking system utilizing a load-responsive pressure reducing valve assembly according to the teachings of the present invention.

Referring to the drawings, FIG. 1 diagrammatically illustrates the application of the load-responsive pressure proportioning reducing valve assembly 13 of the present invention in a typical wheeled vehicle hydraulic brake system having front and rear wheel brake cylinders operated by a conventional tandem master cylinder 3. Master cylinder 3 is operated in the conventional manner by application of treading force indicated at 2 to the brake pedal 1. The secondary portion or section 5 of master cylinder 3 contains an independent but secondary master cylinder chamber which is connected to the front wheel brake cylinders 9 for the respective front wheels 11 via the conduit 6 to form the front wheel braking system. The primary portion 4 of the tandem master cylinder 3 contains a primary chamber which is connected to the inlet 21 of the load-responsive proportioning reducing valve assembly 13 via the conduit 7. The outlet 102 of valve assembly 13 is connected to the rear wheel brake cylinders 10 of respective rear wheels 12 via the conduit 8, which completes the rear wheel braking system. It should be noted for future reference that valve assembly 13 is mounted at the angle $\theta_e$ to the vehicle relative to the road surface and that the valve assembly 13 also is positioned as indicated in relation to the forward direction of travel of the vehicle indicated by the arrow appearing in the lower left-hand corner of the figure.

Figure 2:
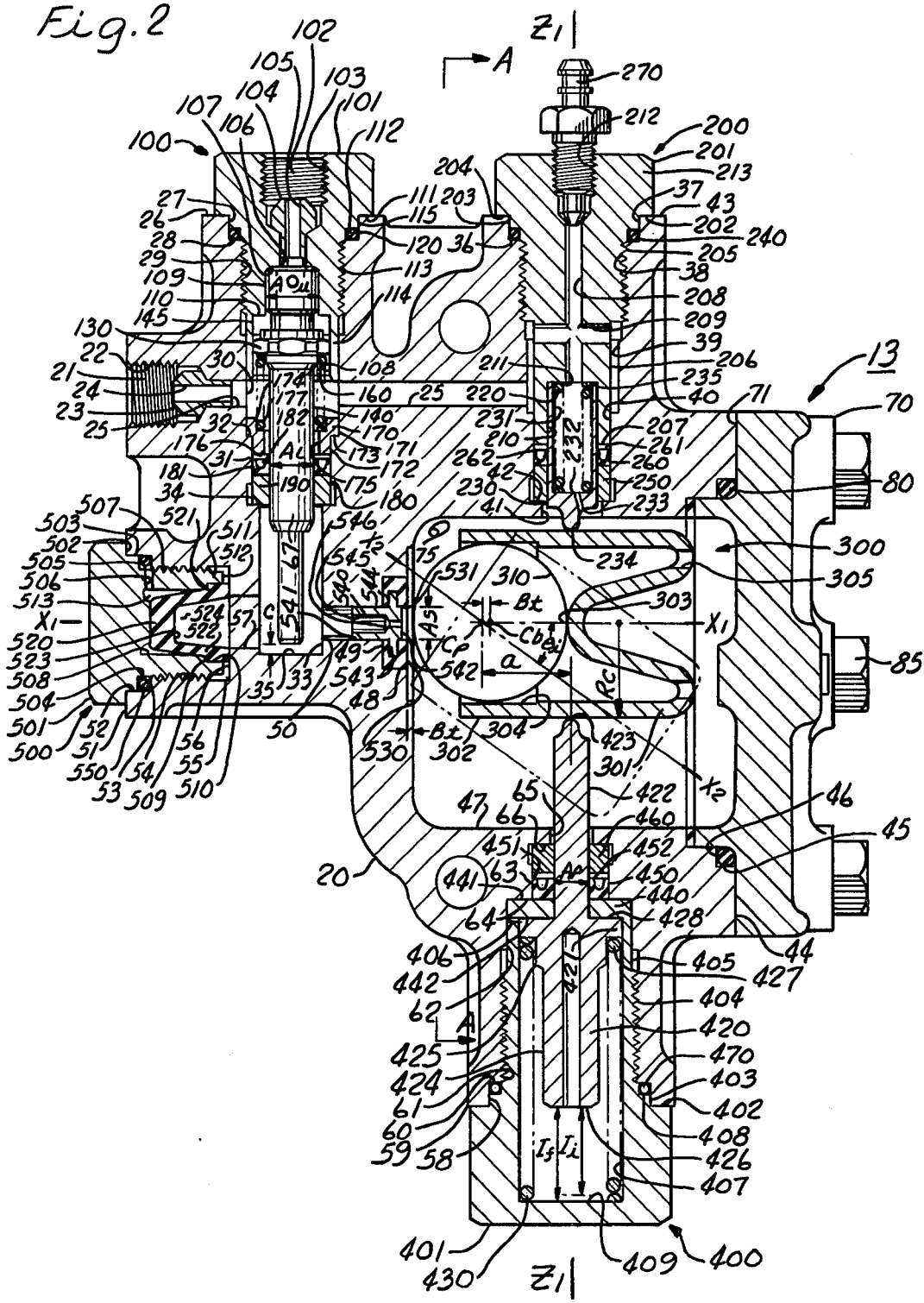
FIG. 2 is a cross-sectional view in side elevation showing the interior of the load-responsive pressure reducing valve assembly of the present invention depicted in FIG. 1.

FIG. 2 illustrates the interior workings of the valve assembly 13. The major sections of the valve assembly are designated as the pressure proportioning reducing valve means 100 which reduces the hydraulic pressure supplied to the rear wheel brake cylinders, the deceleration sensing means 300 which senses deceleration of the vehicle, the sensed deceleration control means 400 which controls the degree of vehicle deceleration to be sensed by deceleration sensing means 300, the control means 500 which controls the point at which the pressure proportioning reduction valve means 100 commences its pressure reduction operation, and the holding means 200 which suppresses the adverse effects of vibrations by continually urging the deceleration sensing means 300 into following support engagement with the sensed deceleration control means 400.

The body of valve assembly 13 is indicated at 20 and the largest opening into the valve body 20 is closed by end cover 70 which seats on end face 44 of the valve body and provides an O-ring chamber 45 with O-ring 80 of high molecular elastic material compressed therein between annular shoulder 46 and contact face 71 of end cover 70 to form a hydraulic seal. This seal prevents leakage of hydraulic fluid from deceleration sensing chamber 47. End cover 70 is secured in place by means of bolts 85.

The valve assemble 13 includes four principle chambers or cavities designated as first chamber 30 in the pressure proportioning reduction valve means or section 100, second chamber 33 (control chamber) in the control means or section 500, third chamber 47 (deceleration sensing chamber) in the deceleration sensing means or section 300, and fourth chamber 407 in the sensed deceleration control means or section 400. The third chamber or deceleration sensing chamber 47 is in communication with inlet 21 of the valve assembly via first chamber 30, fluid passage 25 and orifice 233 provided in the cage retainer 230. The inlet 21 of the valve assembly is, as previously pointed out, connected to the primary section 4 of the tandem brake master cylinder via conduit 7.

In turn, third chamber or deceleration sensing chamber 47 communicates with the second chamber or control chamber 33 in control means 500 via the annular deceleration sensor valve means 530, orifice 546, passage 545 and passage 50. Retainer 540 maintains sensor valve seat 530 in position. This fluid passage between chamber 47 and chamber 33 is closed or open depending respectively upon whether G-sensor 310, which is designated as an inertia-responsive valve member, is seated in annular seat 530 or spaced therefrom as indicated in the figure.

The deceleration sensing means 300 principally consists of the inertia-responsive valve member or G-sensor 310 which senses a predetermined deceleration of the vehicle by shifting its position within the sensor cage 301 in which it is housed such that it moves up the prescribed track or incline 304 in cage 301. Although incline 304 appears to be level in FIG. 2, it must be remembered that it is mounted at the angle $\theta_e$ as indicated in FIG. 1. G-sensor 310 is preferably a metal ball or sphere, as it is thus more readily able to sharply sense the set deceleration and respond.

Sensor cage 301 is a bottomed cylinder having a diameter of 2 Rc, and it is positioned with its open end forward or facing the direction of vehicle travel, as indicated by the arrow in the lower left-hand portion of FIG. 1 or to the left in FIG. 2. The bottom of sensor cage 301 is provided with an axial projection 303 which forms a bottom stop for G-sensor 310. The inner smooth cylindrical surface 304 receives the G-sensor 310 in sliding or rolling engagement, the bottom portion of surface 304 providing the incline for travel thereon by the G-sensor. G-sensor 310 will readily slide or roll downward and seat on stop 303 when the valve assembly 13 or the vehicle in which it is mounted is at rest, under forward acceleration or constant velocity.

The bottom wall of sensor cage 301 is provided with suitable fluid flow ports 305 which provide for the free passage of hydraulic fluid therethrough induced by the displacement of the G-sensor 310 within cage 301 so that free movement of the G-sensor within the cage is not interfered with.

Figure 3A:
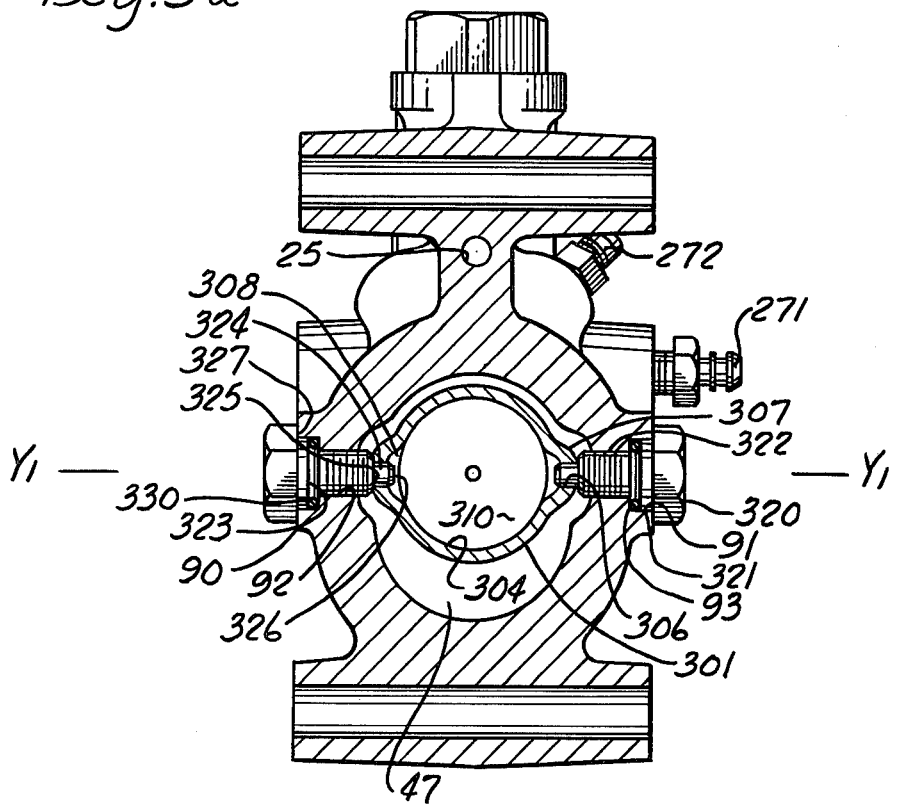
FIG. 3a is a cross-sectional view in front elevation of the load-responsive pressure reducing valve assembly illustrated in FIG. 2 as seen along section line A—A.

As shown in FIG. 3a, the opposite sides of sensor cage 301 are provided with outwardly extending projections 307 which lie on the $Y_1 - Y_1$ axis. This axis is normal to the valve axis $X_1 - X_1$ indicated in FIG. 2. Each of the side projections 307 is provided with a pivot passage 306 to receive pivot pin extensions 324 for pivotal movement of the cage 301 about the $Y_1 - Y_1$ axis.

The shape and dimensions of these side projections 307 are so determined to provide a suitable cavity 308 therein between the inner side of the projections 307 and the G-sensor 310 to insure free movement of the G-sensor within the cage 301.

Opposite sides of the deceleration sensing chamber 47 are provided with opposing step bores 91 through the valve body wall 20. The inner portions of these bores of smaller diameter are provided with a female thread 92. The axis of bores 91 lie on the $Y_1 - Y_1$ axis which horizontally crosses the $X_1 - X_1$ axis at right angles. Axis $X_1 - X_1$ is the axis of the load-responsive proportioning reducing valve assembly 13 which passes through the central axis of the annular deceleration sensing valve seat retainer 540.

The outside end of each stepped bore 91 is provided with the machined holding face 90 which crosses the $Y_1 - Y_1$ axis at right angles. The stepping in the bores 91 also provides the annular shoulders 93 which also lie in planes with cross the $Y_1 - Y_1$ axis at right angles. Pivot bolts 320 are provided with the radial annular projections 321 which statically mate the corresponding step bores 91 and the male threaded portions 322 threadably mate the female threaded portions 92 of the stepped bores to statically secure the bolts in the respective bores. The inner ends of each bolt 320 are provided with axial projections 324 which slidably fit the pivot bores 306 in sensor cage 301 for pivotal movement of the sensor cage on these axial projections 324 about axis $Y_1 - Y_1$.

O-rings 330, which are made of a high molecular elastic material, are compressed and deformed in the gap which is provided between annular shoulders 323 of the radial projections 321 and the annular shoulder 93 of stepped bores 91 when the pivot bolts 320 are threadably engaged in their respective bores such that the bolt heads mate the holding faces 90. This O-ring seal, of course, locks the flow of braking fluid from the deceleration sensing chamber 47 through the stepped bores 91.

Annular shoulders 325 on bolt 320 provide sufficient gap between axial pivot projections 324 and the male threaded portions 322 of the bolts to permit free and highly accurate swinging of sensor cage 301 on pivot projections 324. The axial projections 324 are also provided with a predetermined length such that their projection ends 326 protrude into the cavities 308 but leave a small gap between the projection ends and the G-sensor 310.

Referring to both FIGS. 2 and 3, the center position Cp is the intersection of the $Y_1 - Y_1$ axis and the $X_1 - X_1$ axis. This right angle intersection is predetermined such that it coincides also with the center Cb of the G-sensor 310 at the time when the G-sensor has sensed the predetermined vehicle deceleration and is thus seated in annular valve seat 530, having moved forward on incline 304 along cylinder axis $X_2 - X_2$ of sensor cage 301 such that the spherical surface of the inertia-responsive member or G-sensor 310 is engaged with seat ring 531 of the sensor seat 530. In other words, viewing FIG. 2, when G-sensor 310 moves full left in the figure to engage seat 530 centers Cb and Cp will coincide. This assures that the spherical surface of G-sensor 310 will always maintain good liquid-tight sealing engagement with valve seat 530 no matter what angle sensor cage 301 is permitted to pivot about its pivot axis $Y_1 - Y_1$.

The depth of the projection in the bottom of cage 301 which provides stop 303 is so determined such that when the G-sensor 310 is at rest against stop 303, the center Cb of the G-sensor (which is always on axis $X_2 - X_2$ of the sensor cage 301) is spaced a predetermined distance Bt from center Cp. This represents the amount of distance which G-sensor 310 must travel after it senses the predetermined deceleration of the vehicle and before it makes liquid-tight engagement with sensor valve seat 530. In FIG. 2, the axis $X_2 - X_2$ of sensor cage 301 coincides with axis $X_1 - X_1$ of the valve assembly 13 which passes through the center of orifice 546. However, as sensor cage 301 pivots downwardly about the $Y_1 - Y_1$ axis, the axis $X_2 - X_2$ of the sensor cage 301 no longer coincides with axis $X_1 - X_1$, but rather intersects the $X_1 - X_1$ axis at Cp. This situation is indicated in broken line form in FIG. 2.

The fact that the center Cb of the G-sensor 310 at rest against stop 303 is behind or to the right of the center of oscillation Cp of sensor cage 301 as viewed in FIG. 2, contributes also to the ability of sensor cage 301 to pivot downwardly about pivot axis $Y_1 - Y_1$ and to follow the displacement of position controller 420, as will be described in greater detail hereinafter.

Figure 3B:
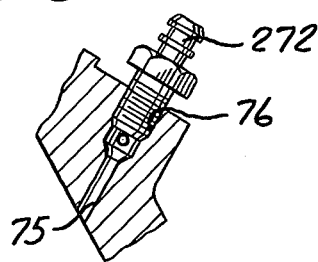
FIG. 3b is a sectional view of a portion of the load-responsive pressure reducing valve assembly illustrated in FIG. 3 as seen along section line B—B.

As shown in FIG. 2 and FIG. 3b, the deceleration sensing chamber 47 is provided with liquid passage 75 which penetrates valve body 20 to bleeding bore 76 on the exterior of the valve body. Bleeding bore 76 threadably receives a conventional bleeder 272 which is used for discharging air existing in deceleration sensing chamber 47 when the valve assembly 13 is filled with braking fluid.

The passage 50 which leads from the deceleration sensing chamber (third chamber) to the control chamber (second chamber) 30 is provided with an enlarged bore 48 to receive and seat deceleration sensing valve seat 530 against annular shoulder 49 of the enlarged bore portion 48. The sensor seat 530 is constructed of high molecular elastic material. Valve seat 530 is seated in a plane at right angles to axis $X_1 - X_1$.

The sensor seat is provided with a central stepped bore of three different diameters in order to receive seat retainer 540 (radial projections 542, 543 and 544 of valve seat retainer 540 respectively) in mating engagement, thus preventing dislodgement of seat 530 from retainer 540. Stem 541 of seat retainer 540 fits within liquid passage 50 in tight engagement.

When stem 541 of seat retainer 540 is pressed into position into liquid passage 50 such that the end face of radial projection 544 engages annular shoulder 49, an annular portion of valve seat 530 is also compressed against shoulder 49 by annular projection 543 of the retainer to insure liquid-tight sealing engagement of the outside faces of sensor seat 530.

The length of projection in the axial direction of portion 542 of the seat retainer 540 is determined to be just slightly shorter than the corresponding mating bore of sensor seat 530 so that the projection end 542 of the retainer is not flush with the outside face of the sensor valve seat 530. Thus, when G-sensor 310 is displaced by the force of inertia generated under the predetermined or set deceleration of the vehicle such that the G-sensor engages valve seat 530, it will also accurately engage projection 542 in order to contribute to the assurance of good liquid sealing. In other words, the contact ring 531, of valve seat 530 will be slightly deformed or compressed by the G-sensor and the surface of the G-sensor will also be in contact with projection 542 of retainer 540.

Valve seat retainer 540 is provided with axial orifice 546 of a small diameter and a larger bore 545. The cross-sectional area of the small bore or orifice 546 is determined to be sufficiently small such that it contributes to make the hydraulic pressure sealed in the control chamber 33 to be as closely equivalent as possible to the desired predetermined or set hydraulic pressure in sensing chamber 47 at the time G-sensor 310 initiates movement from its position of rest. While G-sensor 310 moves from its position of rest and travels the distance Bt to engage valve seat 530, the fluid pressure in sensing chamber 47 is also increasing during this short period of time. The small diameter of orifice 546 helps to prevent a corresponding increase in fluid pressure in control chamber 33 while the deceleration sensing valve is closing.

A stepped series of bores in the sensed deceleration control means 400 penetrates the valve body 20 into deceleration sensing chamber 47. These stepped bores are sequentially of decreasing diameter progressing toward the chamber 47. The axial center of these stepped bores lies on the $Z_1 - Z_1$ vertical axis which intersects the $X_1 - X_1$ axis at a point which is rearward or to the right of the oscillation center Cp of sensor cage 301.

The first bore 58 of the series of stepped bores in sensed deceleration control means 400, is the bore of largest diameter. The next innermost bore 61 is provided with a female thread and this bore is followed by bore 62 of smaller diameter, which in turn is followed by bore 63 of yet smaller diameter and so on. The diameter of the innermost bore 65 is determined to have a value which will provide clearance with the upper stem 422 of the position controller piston 420 coaxially received therein.

Plug 401 closes off this series of bores from the exterior. Plug 401 is provided with a male thread 404 which is threadably engaged with the female thread of bore 61. When plug 401 is tightly secured, annular shoulder 402 thereof engages end face 59 of the valve body 20 and radial projection 403 of the plug is slidably received in the first bore 58. In addition, axial projection 405 of plug 401 slidably fits in bore 62. Liquid-seal is insured by O-ring 470 which is compressed between shoulder 408 of plug 401 and shoulder 60 provided between bores 58 and 61.

The fourth principle chamber of the valve assembly 13 is provided at 407 in plug 401. The bore of fourth chamber 407 is concentric with radial projection 403 and axial projection 405.

Lower annular retainer 440 is provided in the gap formed between the end 406 of plug 401 and the annular shoulder 64. The outer diameter of retainer 440 freely fits bore 62 and slidably receives upper stem 422 of deceleration control piston 420. Cup seal 450 rests on retainer 440 and includes an outer flange 451 that engages bore 63 and an inner annular flange 452 which slidably engages stem 422 in liquid-sealing engagement. Upper retainer 460 is also coaxially positioned in bore 63 and has an outer diameter which freely fits therein and an inner diameter which slidably receives upper stem 422.

The position controller piston 420 consists of the upper stem 422 which extends into deceleration sensing chamber 47 and a lower stem 424 which extends downward into the fourth cavity or chamber 407. Lower stem 424 is provided with an annular flange 421 which has an outer diameter that slidably fits the bore of chamber 407.

The upper end of upper stem 422 terminates at the rounded contact area 423 of hemispherical shape which contributes to smooth sliding engagement with the underside of sensor cage 301. The neck portion 425 of lower stem 424 which extends downwardly from flange 421 is provided with an outer diameter which is slightly larger than the outer diameter of lower stem 424. This shape permits the neck portion 425 to properly support the inner circumference of control spring 430 which is compressed between shoulder 427 of flange 421 and the bottom 409 of chamber 407. Control spring 430 continually biases the position controller piston 420 upward within chamber 407 such that shoulder 428 of flange 421 seats against first retainer 440 as a stop as illustrated in FIG. 2. Control spring 420 has a spring constant Kc and has an installation load of Fce which continuously urges position controller piston 420 to or against a stop provided by shoulder 442 of the first or lower retainer 440.

The axial center of position controller piston 420 coincides with the aforementioned $Z_1 - Z_1$ axis and this piston changes its position smoothly along the same axis.

Cup seal 450 makes liquid-sealing engagement with both the bore 63 and upper stem 422 thereby enabling the upper stem 422 to form the effective pressure receiving area Ap which receives hydraulic pressure supplied to the deceleration sensing chamber 47. The length of upper stem 422 from the upper annular shoulder 428 of flange 421 to the contact portion 423 is selected such that when shoulder 428 engages against stop 442, the contact portion 423 engaging the outer circumference 302 of the sensor cage 301, the position controller piston 420 will hold the cylindrical axis $X_2 - X_2$ of the sensor cage to coincide with the aforementioned axis $X_1 - X_1$ of the valve assembly. When the position controller piston 420 is in its upper limit position as shown in FIG. 2, stroke distance If is provided between its lower stem end 426 and the bottom face 409 of the fourth chamber 407 for reasons to be explained in greater detail hereinafter.

The hydraulic pressure force Pfi.Ap induced by the action of the hydraulic pressure Pfi established in the deceleration sensing chamber 47 on the effective pressure receiving area Ap of the upper stem 422 will over power the installation load Fce of the control spring 430 and will displace or lower the position controller piston 420 for the distance Ii, and the force acting on the position controller piston 420 maintains the equillibrium condition represented by the following formula:

$$\text{Pfi} \cdot \text{Ap} = \text{Fce} + \text{Kc} \cdot \text{Ii} \qquad (1)$$

This descent of the position controller piston 420, with the help of the holding means 200 to be described later, together with the weight in the hydraulic fluid of the deceleration sensing means 300, induces the cage 301 to oscillate or pivot downwardly about axis $Y_1 - Y_1$ in following engagement with the contact portion 423. Central axis $X_2 - X_2$ of cage 301 thus forms the angle $\theta i$ with axis $X_1 - X_1$. This oscillation or pivot angle $\theta i$ of the sensor cage 301 increases the amount of deceleration of the vehicle required to roll the G-sensor 310 up incline 304 in the forward direction of the vehicle's travel.

The sensed deceleration control means 400 is thus set to function only by virtue of the level of the hydraulic pressure in the deceleration sensing chamber 47 as the position controller piston 420 has only one effective pressure receiving area Ap which is formed or provided by reason of the single cup seal 450. Pressure proportioning reduction valve assemblies of the prior art incorporated similar pistons of a conventional type which had a plurality of effective pressure receiving areas. As the position controller piston 420 of the present invention has only one pressure receiving area, it makes it possible to suppress the variation in the forces of friction generated in the operating piston to a minimum. This ability of the sensed deceleration control means 400 of the present invention to minimize the change which would otherwise be observed in the operation suppressing force of the position controller piston 420 with respect to the aforementioned change in level of hydraulic pressure in the chamber 47, contributes to the accurate and dependable oscillatory or pivotal movement of sensor cage 301 in following the change in the level of hydraulic pressure in the deceleration sensing chamber 47.

The housing chamber for the holding means 200 is provided with a sequentially stepped bore starting with first bore 37 which is the bore of largest diameter at the uppermost end of valve body 20. The next lower bore 38 is provided with a female thread and is followed by a third bore 39 of yet smaller diameter. Bore 39 is followed by a fourth bore 40 and fifth bore 41, each of smaller diameter than the previous bore thereby providing a series of bores of sequentially smaller diameter leading from the exterior of the valve body 20 to the interior of deceleration sensing chamber 47. These bores are formed concentrically. The diameter of bore 41, closest to chamber 47, is such as to permit cage retainer 230 to slide axially therethrough with clearance. The upper end of these series of bores is closed off with plug 201, the threaded shank portion 205 of which is threadably received in female threaded bore 38 such that the annular shoulder 204 of the bolt head 213 is in tight engagement with the opening end face 43. At the same time, radial projection 203 of the bolt head slidably engages first bore 37. A liquid-tight sealing engagement of the plug 201 in the bore is insured by means of a suitable O-ring seal 240 which is compressed between the bottom annular shoulder formed by projection 203, and the annular shoulder 36 at the bottom of bore 37.

Plug 201 is provided with an axial projection 206 at the bottom thereof which is slidably engaged in bore 40. Diametrical passage 209 and axial passage 208 penetrate plug 201. The bottom of axial passage 208 terminates into a bore of larger diameter designated as the holding bore 210 which is provided in axial projection 206 of the plug. Holding bore 210 slidably receives cage retainer 230 therein. The upper end of axial passage 208 terminates in bleeding bore 212 which is provided in the head portion 213 of the plug. This bore is provided with a female thread that threadably receives a conventional air bleeder 270.

Radial or diametrical liquid passage 209 in the head portion of the projection 206 of the plug communicates with axial liquid passage 208 in the center of the plug and with the clearance formed between bore 39 and the outer circumference of projection portion 206 of plug 201. This passage in turn communicates with liquid passage 25. Hydraulic fluid under pressure from inlet 21 thus communicates with holding bore 210 via passage 25, bore 39, passage 209 and passage 208.

In the gap formed between axial projection end 207 of plug 201 and the annular shoulder 42 is provided, in the order illustrated in the figure, the seal retainer 250 which has an outer diameter that freely fits bore 40 and an inner diameter that slidably receives cage retainer 230. This seal retainer is followed by cup seal 260 which has an outer flange 261 that makes liquid-sealing engagement with bore 40 and inner flange 262 that makes liquid-sealing engagement with cage retainer 230. Cage retainer 230 is cylindrical in form and its axis lies on the $Z_1 - Z_1$ axis and it axially slides along the same axis.

The central portion of cage retainer 230 is provided with blind bore 231 which is coaxially opened at the top with holding bore 210 and which terminates at the bottom face 232.

The lower end of cage retainer 230 terminates with contact portion 234 of hemispherical shape which engages sensor cage 301 smoothly and follows oscillatory movements of the sensor cage about sensor cage pivotal axis $Y_1 — Y_1$. The overall length of cage retainer 230 from contact portion 234 to open end 235 is determined such that when the position controller piston 420 is at its uppermost limits for position as shown in the figure, there still remains a very small gap between open end 235 and annular shoulder 211. The length of cage retainer 230 is also such that when position controller piston 420 is in its lowermost position as shown by the two-dot broken line, a sufficient portion of the cage retainer 230 will remain in holding bore 210 even though the contact portion 234 engages the top outer circumference of sensor cage 301 at its lowermost position of pivot about axis $Y_1 — Y_1$. This determination of length of cage retainer 230 assures stabilized movement of the cage retainer throughout its whole range of operation in following the oscillations of sensor cage 301.

Between annular shoulder 211 of plug 201 and the bottom face 232 of cage retainer 230 is installed the retaining spring 220 which acts with a light force to continually urge the cage retainer 230 downwardly so that the contact portion 234 continually engages the outer circumference 302 of the cage 301 and follows the oscillations of the sensor cage. Thus, cage retainer 230 continually urges cage 301 into following support engagement with position controller piston 420.

The bottom face 232 of cage retainer 230 is provided with orifice 233 which communicates blind bore 231 with deceleration sensing chamber 47. The cross-sectional area of this orifice is smaller than the cross-sectional area of any of the flow passages leading thereto from inlet 21 and all hydraulic fluid under pressure passing from inlet 21 to chamber 47 must pass through orifice 233 as cup seal 260 prevents passage of fluid under pressure through bore 40.

The cross-sectional area of orifice 233 is predetermined such that substantially no time lag takes place in establishing the hydraulic pressure level in deceleration sensing chamber 47 to be that of the pressure of the fluid at inlet 21 when the vehicle braking operation is conducted by a slow pressure application to the brake pedal. However, the orifice 233 is sufficiently small to provide a suitable time lag for build up of pressure in chamber 47 as compared to that at the inlet 21 in proportion to the rate of increase of the braking operation, i.e., when brake pedal pressure is applied very rapidly.

The braking operation which is most commonly done in motor vehicles is a braking operation by slow brake pressure application, and the change of hydraulic pressure or the amount of hydraulic pressure increase over a given unit length of time in the braking system under such slow pressure braking operations is also comparatively slow.

The relationship between the hydraulic pressure supplied to the vehicle brakes and the deceleration thereby generated at the time of the braking operation due to slow pressure brake application does not involve any substantial time lag. However, as the speed of the braking operation increases, a time lag occurs in proportion to the increase between the supply of hydraulic pressure to the brake and the generation of deceleration to be induced by that hydraulic pressure.

The load-responsive proportioning reduction valve 13 of the present invention senses a set or predetermined deceleration by the sensed deceleration control means 400 which operates by the action of hydraulic pressure established in deceleration sensing chamber 47. In this manner, it senses the preset braking hydraulic pressure determined in accordance with variation in the weight of load on the vehicle and the preset deceleration of the vehicle generated by it. The valve assembly of the present invention displays the normal braking function when the preset deceleration is induced in the vehicle at the same time that the preset amount of hydraulic pressure is supplied to the vehicle brake.

Consequently, where such a relationship exists, and in the course of continuous increase of hydraulic pressure generated by the tandem master cylinder 3, the set deceleration in the vehicle is not induced at the same point of time that the preset hydraulic pressure is supplied to the vehicle brake such that deceleration is induced only after a very short time lapse. The G-sensor 310 does not operate at the point of time that the preset pressure is established in the deceleration sensing chamber 47. At the point of time that the set deceleration is generated, the sensed deceleration control means 400 undergoes further displacement due to the establishment of hydraulic pressure beyond the set or predetermined hydraulic pressure or the deceleration sensing chamber 47 and the G-sensor 310 no longer operates at the set or predetermined deceleration. The fluid passage restriction effect of orifice 233 makes a useful contribution in solving this problem that takes place at such time when the vehicle braking operation is done with fast or quick brake pressure application, by compensating for this time lag.

When the hydraulic pressure level supplied to the deceleration sensing chamber 47 reaches the set value Pfb, which will be explained in greater detail hereinafter, the position controller piston 420 receiving that hydraulic pressure displaces downwardly until the lower stem end 426 thereof contacts bottom face 409 of plug 401 and compresses control spring 430 to maintain the condition of equilibrium set forth in the following formula:

$$Pfb' \cdot Ap = Fce + Kc \cdot If \qquad (2)$$

Even if the hydraulic pressure level supplied to deceleration sensing chamber 47 increases beyond the set value Pfb', the position controller does not undergo any further displacement. When the hydraulic pressure level supplied to deceleration sensing chamber 47 is above Pfb', sensor cage 301, which follows the displacement of position controller piston 420, makes the largest swing about axis $Y_1 — Y_1$ and the angle of axial center line $X_2 — X_2$ with respect to axial center line $X_1 — X_1$ obtains the maximum value. The localized figure shown in FIG. 2 in two-dot broken lines shows the position of sensor cage 301 at this maximum downward swing value.

Turning next to control means 500, another stepped series of bores is provided through valve body 20 to second chamber or control chamber 33. The outer bore 52 of greatest diameter is followed by female threaded bore 54 of slightly smaller diameter. Bore 54 then leads to bore 55 of yet smaller diameter, which in turn leads to bore 57 of even smaller diameter, which communicates with control chamber 33. These bores are concentrically arranged with each other. However, the axis of these concentrically arranged bores need not necessarily coincide with axis $X_1 — X_1$.

The passage formed by these concentric bores is sealed in a liquid-tight manner with plug 501. The threaded shank 507 of plug 501 is threadably received in bore 54 with the annular shoulder 502 engaging the machined end face 51 of the valve body and with the radial projection 503 slidably fitting the first bore 52. Axial projection 511 of plug 501 freely fits in bore 55. Liquid-tight sealing is insured by O-ring member 550 which is compressed in the gap formed between annular shoulder 504 at the periphery of radial projection 503 and the annular shoulder 53.

The length of axial projection 511 is determined so as to provide a suitable gap between axial projection end 512 and the annular shoulder 56. This gap contributes to the suitable compression of the radial projection 521 of the elastic absorber 520, to be described hereinafter. Also, the cavity formed between the ring groove 505 and the liquid-sealing member 550 and the cavity formed between the second bore 55 and the axial projection 511 are made to communicate with each other by the gap formed between the female threaded bore 54 and the male threaded shank 507 to form an external cavity about the stem portion of plug 501.

A blind bore 508 is provided in the central portion of plug 501 and is concentric with the radial projection 503 and axial projection 511. An enlarged bore 510 is provided at the opening of blind bore 508. The ring groove 505 and blind bore 508 communicate with each other by the radial passage 506.

Absorber 520 (pressure absorbing means), which is of a truncated conical shape and has an inner side wall 522 and bottom wall 523, is positioned in the cavity formed by blind bore 508 and the enlarged bore 510. Absorber 520 is made of a high molecular elastic material.

A radial projection 521 is provided on the outer circumference of the opening of absorber 520. This radial projection 521 is provided with such dimensions and shape that it will be suitably compressed in the axial direction to perform a tight liquid-sealing function when it fills the cavity formed between annular shoulder 56, annular shoulder 509 and the enlarged bore 510. The blind bore 508 of cylindrical shape and the outer circumference of side wall 522 of the absorber of truncated conical shape define the walls of the internal cavity of plug 501.

Absorber cavity 524 in combination with the bore 57, bore 33, liquid passage 50, large bore 545 and small bore or orifice 546, actually constitute the control chamber rather than chamber 33 alone.

When the fluid pressure of the braking liquid filling the control chamber is not increased, the external cavity and internal cavity of plug 501 are filled with air at atmospheric pressure. An increase in the hydraulic pressure supplied to the control chamber acts on the inner wall of absorber 520 and thereby expands it, causing its outer wall to approach or come nearer to the inner wall of blind bore 508. This expansion of absorber 520 increases the air pressure in the internal cavity of plug 501 and this air of increased pressure is transmitted to the external cavity of plug 501 via radial passage 507, thereby mitigating the increase of pressure in the internal cavity.

The hydraulic pressure rigidity of absorber 520 is enhanced proportionately as the hydraulic pressure established in the control chamber rises due to the contribution of the air filling the internal cavity and external cavity.

The control means 500 is generally considered to consist of the aforementioned control chamber, absorber, internal cavity and external cavity with the addition of sensor seat 530 and seat retainer 540 that have already been described.

The control chamber is provided with a suitable air bleeding passage 67 which penetrates the valve body 20 to another conventional air bleeder (not shown) which is screwed into the valve body 20 in an identical manner as is air bleeder 270 or 272. This bleeder contributes to the discharge of air in the conventional manner when the valve assembly 13 is installed in a vehicle brake system and the brake system is filled with braking fluid.

Turning next to the pressure proportioning reduction valve means 100, access to first chamber 30 is provided by means of a stepped series of concentric bores from the exterior of valve body 20, the outermost bore of largest diameter being bore 27, which is sequentially followed internally by threaded bore 29 which in turn communicates with the first principal cavity or bore 30, each bore being of smaller diameter than the last. First bore 30 communicates with control chamber or bore 33 via bore 31 of intermediate diameter. All of the aforesaid bores of sequential decreasing diameter are made concentric.

First principal cavity or chamber 30 communicates via liquid passage 25 to bore 39 of holding means 200 and to inlet 21 as previously explained. Inlet 21 is provided with tube seat 23 and also is provided with a female thread 22 which is adapted for coupling with a common pipe joint for conduit 7. Liquid passage 24 penetrates the center of tube seat 23 for communication with passage 25 to supply hydraulic brake fluid under pressure from the primary chamber of section or portion 4 of the tandem master cylinder 3 to the valve assembly.

Plug 101 tightly seals bore 27 from the exterior and has a threaded shank portion 113 theadably received in bore 29 such that annular shoulder 111 of the plug engages opening end face 26 and radial projection 115 slidably engages first bore 27. Axial projection 130 of the plug statically fits into first bore or chamber 30. A liquid sealing member or O-ring 120 is suitably compressed in the gap formed between the annular shoulder 112 on the border of radial projection 115 and the annular shoulder 28 to provide liquid sealing. Bore 108 and bore 109 are concentrically provided in the central part of plug 101 and they communicate to outlet 102 via passage 106 of smaller diameter.

Outlet 102 is provided with tube seat 104 and with a female thread 103 which is adapted for conventional coupling with a pipe joint for conduit 8 leading to the rear wheel brake cylinders of the vehicle. Passage 105 is axially provided through tube seat 104 for the passage of fluid from the bottom of bore 106 to outlet 102.

Spring retainer 170 is installed in first chamber or bore 30 and bore 31 and annular shoulder 138 thereof rests on annular shoulder 32. The large diameter portion 171 freely fits in chamber 30 and the small diameter portion 172 slidably fits into bore 31.

Large bore portion 174 and small bore portion 175 penetrate spring retainer 170 forming inner annular shoulder 177. These bores are concentric with the small diameter bore 172. The inner diameter of the large bore portion 174 is determined such that it freely fits the outer diameter of return spring 160 and its inner wall and annular shoulder 177 serve to hold the lower end and outer circumference of return spring 160 in cooperation with the neck portion 139 of the proportioning valve plunger 130. The inner diameter of small bore portion 175 is such that it receives plunger stem 140 with sufficient clearance. The lower end portion 176 of the small diameter portion 172 serves to anchor the cup seal 180 in bore 31.

The space formed between annular shoulder 34 of bore 31 and the lower end portion 176 received in order as illustrated in the figure, seal retainer 190 and cup seal 180. The outer diameter of retainer 190 freely fits bore 31 and the inner diameter thereof slidably receives plunger stem 140. Outer flange 181 of cup seal 180 engages bore 31 and inner flange 182 engages plunger stem 140 in a liquid-sealing manner. Valve plunger 130 is positioned such that its axial center coincides with the axial center of plug 101 and bore 33.

Figure 4:
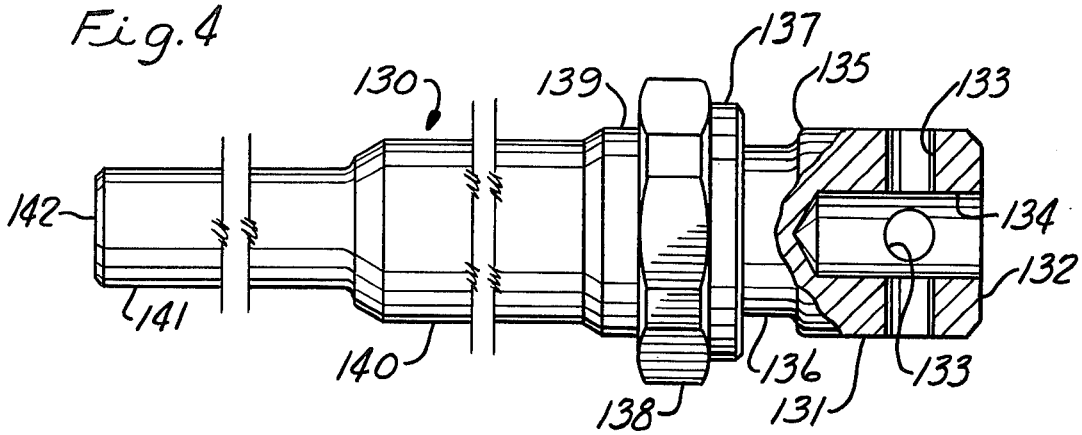
FIG. 4 is an enlarged view in partial section of the plunger valve utilized as a portion of the pressure proportioning valve in the valve assembly of FIG. 2.

Valve head 131 is provided at the uppermost portion of valve plunger 130 and is received in the outlet chamber formed by bore 109 with a suitable liquid passage annular gap therebetween. The upper end 132 of valve head 131 is engageable with annular shoulder 107 and the lower end thereof is provided with contact portion 135 (FIG. 4) which is provided with a curved surface to perform a valve function in cooperation with valve seat 156 of the seal valve 145.

Liquid passage 134 is provided in the central portion of the valve plunger 130 and opens to the upper end 132. Radial liquid passage 133 passes diametrically through head 131 and communicates axial liquid passage 134 to the outer circumference of the valve head 131. The annular gap liquid passage provided between bore 109 and valve head 131 together with the radial liquid passage 133 and axial liquid passage 134 form a portion of the liquid passage from inlet 21 to outlet 102.

Valve plunger 130 is provided with flange 138 which is received in bore 108 of the plug 101 and has requisite liquid passage gaps provided between it and the inner wall of bore 108. Flange 138 at the same time slidably fits bore 108. In order to accomplish this, the flange is constructed with a hexagonal periphery such that the vertices of the hexagon slidably engage the bore 108 and the flat side of the hexagon form liquid passage gaps between them and bore 108.

Valve plunger 130 is provided with the seal retaining portion 137 which protrudes upward from the upper end of the hexagonal flange 138. This seal retaining portion 137 is constructed to have an outer diameter which enables it to form a suitable annular liquid passage between it and the flange inner side 148 in order to accurately hold the seal valve 145 contained between annular shoulder 110 and the hexagonal flange 138.

Figure 5:
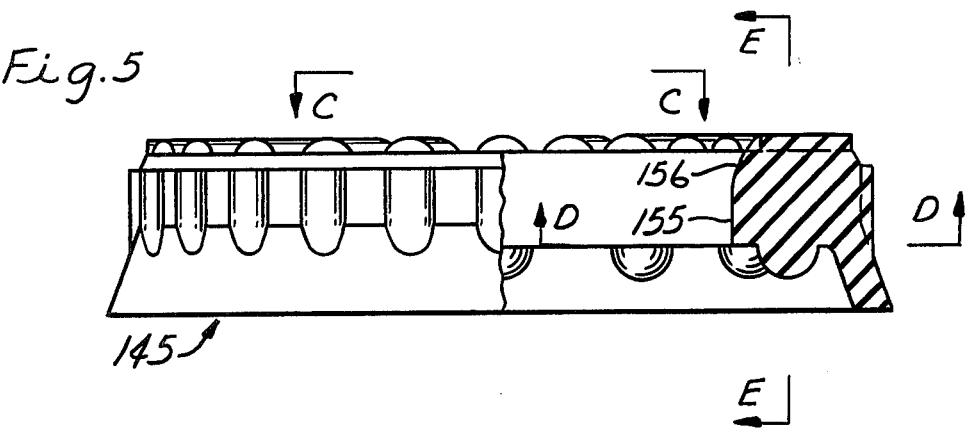
FIG. 5 is an enlarged view in partial section of the proportioning valve seat in the valve assembly of FIG. 2.
Figure 6:
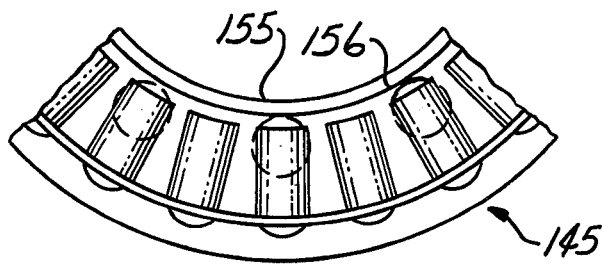
FIG. 6 is a top view of the valve seat illustrated in FIG. 5 with portions broken away as viewed on line C—C.
Figure 8:
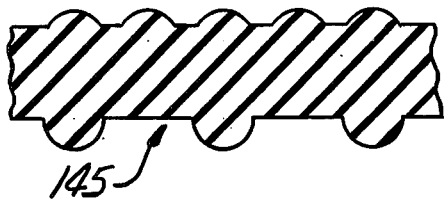
FIG. 8 is a sectional view in side elevation of the valve seat illustrated in FIG. 5 as seen along section line E—E.
Figure 7:
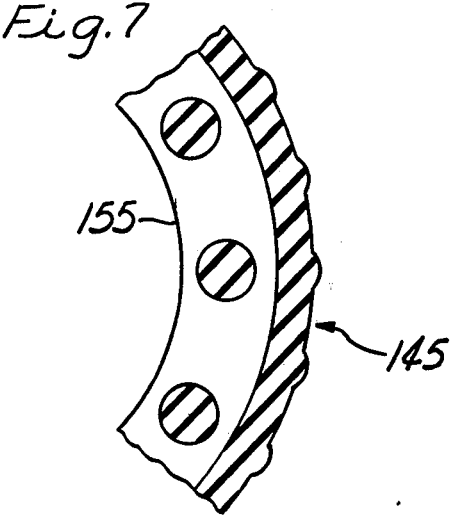
FIG. 7 is a bottom view in partial section of the valve seat illustrated in FIG. 5 as viewed from section line D—D.

Valve plunger 130 is provided, between the lower end of valve head 131 and the upper end of the seal retaining portion 137, with the reduced diameter portion 136 which is of smaller diameter than either of the other two mentioned portions. The diameter of this reduced diameter portion is determined such that it enables this portion to form a requisite annular liquid passage between it and the central passage 155 of seal valve 145. The diameter of passage 155 is determined with respect to the diameter of valve head 131 (see FIG. 5).

The aforementioned gap liquid passage between bore 108 and hexagonal flange 138 together with the aforementioned annular liquid passage between flange inside 148 and retaining portion 137, the gap liquid passage formed between the upper end of seal retaining portion 137 and the boss gap 152 of the seal valve 145, and the annular liquid passage between the central hole 155 and the reduced diameter portion 136 form a portion of the liquid passage leading from inlet 21 to outlet 102.

Valve plunger 130 is provided with plunger stem 140 which extends from the lower end of hexagonal flange 138 into the control chamber or bore 33 to the respective center passages of spring retainer 170, cup seal 180 and seal retainer 190. The diameter of this plunger stem 140 is determined depending on the determination of the effective pressure receiving area formed by the liquid sealing engagement of the plunger stem 140 with cup seal 180. This pressure receiving area is one of the factors which relate to the determination of the pressure reduction ratio of the proportioning reduction valve means 100.

Under flange 138, valve plunger 130 is provided with neck portion 139 having a diameter somewhat larger than the diameter of stem 140. The diameter of neck portion 139 is determined such that it enables the neck portion to slidably fit in the inner circumference of the return spring 160 and thus centers the return spring with respect to the valve plunger 130 in cooperation with the large bore portion 174 of spring retainer 170.

Valve plunger 130 is provided with axial projection 144 which extends further downward into the control chamber. The length of this axial projection is determined such that it produces an appropriate gap C between the lower end 142 and the bottom face 35 when plunger valve 130 is biased with the upper end 132 in engagement with annular shoulder 107. The value of this gap C is determined within such limits that the upper portion of the inner wall of the central passage or bore 155 will not overlap the radial liquid passage 133 when the valve plunger 130 comes down as a result of the valve head 131 finding its way into and expanding the central passage 155 of seal valve 145.

Return spring 160 has a spring constant Kr and installation load of $Fr - \Delta X \cdot Kv$. This spring constant and installation load are set at minimal values required for urging the valve head 131 from the central passage 155 of the seal valve 145, in spite of the elasticity forces of the seal member and the downward pressures on the valve plunger 130 due to the very small residual hydraulic pressures which exist on the outlet 102 side. A detailed explanation of the operation of the plunger valve in cooperation with the seal seat 145 may be obtained by reference to U.S. Pat. No. 3,736,031 issued May 29, 1973 and to Columns 9 and 10 and FIGS. 3, 4, 5 and 6 thereof in particular for the seal valve seat structure depicted herein in corresponding FIGS. 5, 6, 7 and 8, respectively.

The return spring 160 contributes to the retention of valve plunger 130 in the position illustrated in the figure until a predetermined value of hydraulic pressure supplied to inlet 21 changes in correspondence to the level of hydraulic pressure sealed in the control chamber is obtained.

Valve plunger 130 has an effective pressure receiving area Al formed therein by the liquid-seal engagement of cup seal 180 with plunger stem 140. Valve plunger 130 is displaced downward when an increased hydraulic pressure above a predetermined value at which the level of hydraulic pressure supplied to the inlet 21 varies in correspondence to the level of hydraulic pressure sealed in the control chamber acts on its effective pressure receiving area Al. When the degree of descent reaches $\Delta X$, valve plunger 130 then has an effective pressure receiving area Au formed therein by reason of the liquid-sealing engagement of its contact portion 135 with valve seat 156 of the seal valve 145. These two effective pressure receiving areas formed in the valve plunger 130 are made to satisfy the relationship of Au>Al.

When the mutual positions of the valve plunger 130 and the seal valve 135 are in the relationship shown in the figure, the hydraulic pressure established in the control chamber acts on the effective pressure receiving area Al, and produces a force to push the plunger 130 upward in cooperation with the installation load of return spring 160. When the mutual positions of the plunger 130 and the seal valve 145 are in the relationship shown in the figure, the hydraulic pressure that has been sent from inlet 21 directly to outlet 102 via the aforementioned liquid passage acts on the effective pressure receiving area Al and produces a force to push the plunger 130 downward.

When plunger 130 and seal valve 145 are in such mutual positions that the contact portion 35 and the valve seat 156 are in a liquid-sealing engagement, the force that pushes plunger 130 upwards consists of the hydraulic pressure force produced by the hydraulic pressure of the control chamber acting on the effective pressure receiving area Al and the repulsive force Fr of the return spring 160, to which is further added the hydraulic pressure force produced by the hydraulic pressure supplied to the inlet 21 which acts on the annular effective pressure receiving area Au-Al. The force that pushes plunger 130 downward becomes the hydraulic pressure force produced by the hydraulic pressure established at outlet 102 which acts on the effective pressure receiving area Au.

In consequence, the liquid-sealing engagement of contact porton 135 with valve seat 156 is maintained as long as the force acting on the plunger valve is in the condition that the downward pushing force is greater than or equal to the upward pushing force.

When the valve head 131 is in such a condition that its upper end 132 is engaged with annular shoulder 107, the seal valve 145 which performs the principal function of the proportioning reducing valve means 100 in cooperation with valve plunger 130 is placed in the annular cavity formed by the annular shoulder 110, bore 108, hexagonal flange 138, seal retaining portion 137 and the reduced diameter portion 136.

As mentioned, an outline of the construction, function and operation of seal valve seat 145 is described in the aforementioned U.S. Pat. No. 3,736,031, and the Patent disclosure is incorporated herein by reference to that extent. The pressure proportioning valve means 100 restricts the flow of fluid from inlet 21 to fluid outlet 102 during a predetermined range of increasing fluid pressure at the outlet 102. The proportioning reducing valve means 100 acts in such a manner that when it is first in the course of pressure ascent during which the hydraulic pressure supplied to inlet 21 increases beyond a predetermined value, liquid volume and hydraulic pressure are transmitted from inlet 21 to outlet 102 at a predetermined ratio. When it is in the course of pressure descent during which the hydraulic pressure that has been supplied to the inlet 21 comes down to the neighborhood of the predetermined value, hydraulic pressure is transmitted from outlet 102 to inlet 21. When it is in the course of pressure descent during which the hydraulic pressure that has been supplied to inlet 21 comes down or reduces further beyond the neighborhood of the predetermined value, liquid volume and hydraulic pressure are transmitted from outlet 102 to inlet 21. A principal role in performing this function is played by the relationship between the dimensions and shapes of the seal valve 145 and plunger 130.

The hydraulic pressure that has been supplied to the chamber on the inlet side of the proportioning valve means 100 in the situation wherein the braking operation is carried out by slow pressure application, is transmitted without delay to the deceleration sensing chamber 47 and the control chamber, and it is also transmitted to the rear brake at the same time. When the deceleration of the vehicle generated by this braking hydraulic pressure reaches the predetermined value, G-sensor 310 becomes engaged with sensor seat 530.

The hydraulic pressure sealed in the control chamber (33 etc.) at the time G-sensor 310 begins to engage with sensor seat 530 is at the same level as the hydraulic pressure supplied to inlet 21 and first chamber 30. The inertia produced in the G-sensor 310 by the deceleration of the vehicle acting thereon, compresses and deforms the circumference of the contact ring 531 of sensor seat 530 and insures a liquid-sealing engagement of the G-sensor with the sensor seat. The compression and deformation of the circumference of the contact ring 531 by the G-sensor causes a very slight decrease in the capacity or volume of the control chamber, and accordingly, slightly raises the level of hydraulic pressure sealed within the control chamber to a level slightly higher than the level of hydraulic pressure supplied to the inlet 21 and chamber 30 at that instant.

The absorber cavity 524 formed in the absorber 520, which is included in the control means 500, expands in proportion to the level of hydraulic pressure supplied to the control chamber and to the value of the hydraulic pressure rigidity possessed by the absorber 520. A portion of the increased hydraulic pressure in the control chamber resulting from the compression and deformation of the circumference of contact ring 531 is absorbed by the expansion of absorber cavity 524, while another portion thereof forces outer flange 181 and inner flange 182 of cup seal 180 inward and outward respectively and thereby escapes around cup seal 180 to the first chamber 30. Cup seal 180 thus acts more or less as a check valve and blocks the flow of hydraulic fluid under pressure directly from chamber 30 to the control chamber, but permits the flow of hydraulic fluid under pressure from the control chamber to be transmitted past cup seal 180 to first chamber 30 when fluid pressure in the latter chamber is less.

When the proportioning, reducing operation of the pressure proportioning reducing valve means 100 begins, plunger 130 moves downward for the distance $\Delta X$ from its position shown in FIG. 2 by the force of hydraulic pressure acting on it and brings the contact portion 135 in liquid-sealing engagement with valve seat 156. This descent of valve plunger 130 makes the capacity of the seal control chamber smaller (reduces its volume) and increases the hydraulic pressure sealed in the control chamber.

At this point, absorber 520 plays the role of absorbing as much as possible of this rise in hydraulic pressure caused by the descent of plunger 130 for the distance $\Delta X$. This also permits descending of plunger valve 130 with a minimum of suppression due to pressure increase in the control chamber.

If the diameter of plunger stem 140 is represented by D1 and the hydraulic pressure rigidity of the control chamber including the absorber 520 is represented by $\Phi a$, then the tiny increase $\Delta IP$ of hydraulic pressure in the control chamber caused by the ΔX descent of plunger 130 is obtained from the following formula.

$$\Delta IP = \frac{0.7854 \, D^2 \Delta X}{\Phi a} \quad (4)$$

Figure 10:
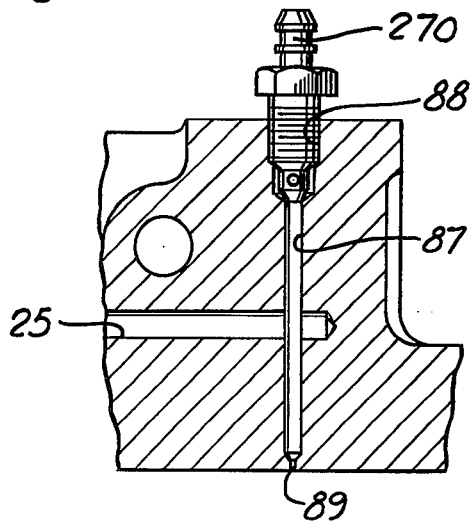
FIG. 10 is a sectional view of a portion of the valve assembly of FIG. 2 illustrated with the omission of the holding means 200 illustrated therein.

FIG. 10 shows a construction of the load-responsive proportioning valve assembly 13 of the present invention in FIG. 2 which is simplified by the removal of the holding means 200. Cage retainer 230 has been removed in entirety in FIG. 10 and orifice 233 has been substituted with orifice 89. Threaded bleeding bore 88 has replaced bore 212 and bleeder 220 is threadably received therein in the same manner as illustrated in FIG. 2. Liquid passage 87 communicates bore 88 with deceleration sensing chamber 47 via restriction orifice 89. Passage 87 also communicates with fluid passage 25. Bleeder 270 is used in the same conventional manner to contribute to the expulsion of air from the liquid passages 85 and 87 and the orifice 89 when the valve assembly is installed in a vehicle braking system and filled with brake fluid. The cross-sectional area of orifice 89 is determined with the same considerations previously mentioned with regard to orifice 233 of FIG. 2.

The modification shown in FIG. 10, which dispenses with the holding means 200 is effective in those cases where deceleration sensing means 300 can accurately follow the displacement of the sensed deceleration control means 400 by virtue of gravitational effects on its mass in liquid, or in situations where end or contact 423 of deceleration control piston 420 is slidable and pivotally secured directly to cage 301 (not shown).

Figure 9:
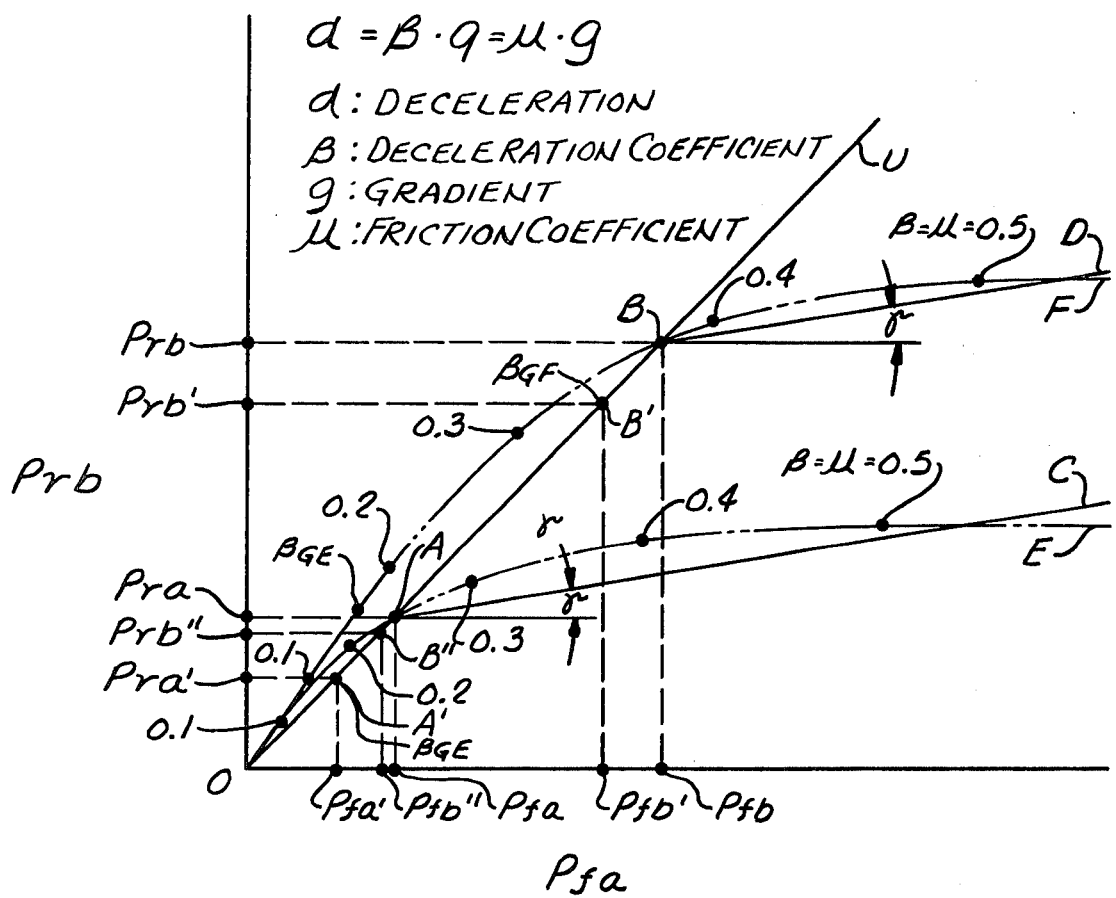
FIG. 9 is a graph illustrating the proportioning pressure reduction distribution characteristics of the valve assembly of the present invention under unloaded and full load conditions.

The graphic illustration of FIG. 9 shows the relationship between hydraulic pressure to be supplied to the front wheel brakes 9 and that to be supplied to the rear wheel brakes 10 of a vehicle which is to be equipped with the load-responsive proportioning valve assembly 13 of the present invention. Curves OAE and OBF show the relationship of hydraulic pressures that should be supplied to the front wheel brakes 9 and rear wheel brakes 10 to create an ideal condition in which the front and rear wheels reach a locked condition simultaneously for the vehicle in an unloaded condition and a full load condition respectively on a road surface of a given surface friction coefficient. Curve OAE is designated the unloaded ideal braking hydraulic pressure distribution curve and curve OBF is designated the full load ideal braking hydraulic pressure distribution curve.

The ideal braking hydraulic pressure distribution curve for all intermediate load conditions between the unloaded and full load conditions make a group of curves passing through the origin O and which lie between curves OAE and OBF, and these curves would appear substantially similar in configuration.

Line OU shows the relationship in situations where substantially equal hydraulic pressures are generated in the secondary chamber and primary chamber of secondary section 5 and primary section 4 respectively of the tandem master cylinder 3 and are supplied respectively to the front wheel brakes 9 and rear wheel brakes 10. This line is designated the ordinary braking hydraulic pressure distribution line. Line OU, therefore, shows the relationship between the hydraulic pressure that should be supplied to the front wheel brakes 9 and the hydraulic pressure that should be supplied to the rear wheel brakes 10 in situations where the hydraulic pressure control valve assembly is not used in the braking fluid circuit or is not in operation. Naturally, this line is a bisector of the angle of the coordinate axis and passes through the origin O.

The polygonal line OAC and polygonal line OBD represent a relationship for ideal braking liquid distribution curves under respective load conditions simulated by front and rear wheel brake fluid distributions by the use of the load-responsive proportioning valve assembly 13. The polygonal line OAC is designated the unloaded proportioning-reducing distribution line and the polygonal line OBD is called the full load proportioning-reducing distribution line. Points A and B on line OU illustrate that the proportioning-reducing valve means 100 begins the proportioning-reducing action when the relationship between the hydraulic pressure sealed in the control chamber and the hydraulic pressure supplied to inlet 21 is in the condition of Pfa′, Pfa at the time of unloaded conditions, and in the condition of Pfb′, Pfb at the time of full load conditions, and in addition, the hydraulic pressure supplied to inlet 21 increases beyond Pfa, Pfb at the time of these conditions respectively.

Point A is designated the unloaded proportioning-reducing starting point and point B is designated the full load proportioning-reducing starting point. Point A′ and point B′, which are located at a slightly lower hydraulic pressure level than point A and point B on line OU respectively, indicate the points at which the hydraulic pressures Pfa′, Pra′ and Pfb′, Prb′ corresponding thereto, are supplied to the front wheel brakes 9 and the rear wheel brakes 10, the former under unloaded conditions and the latter under full load conditions. A deceleration of $d_{GE}(=\beta_{GE}g)$ is generated in the former case in a deceleration of $d_{GF}(=\beta_{GF}g)$ is generated in the latter case in the vehicle and the pressures Pfa′ in the former case and Pfb′ in the latter case are sealed in the control chamber. These values of $\beta_{GE}g$ and Pfa′ are designated the detected deceleration and sealed hydraulic pressure respectively at the time of unloaded conditions and the values $\beta_{GF}g$ and Pfb′ are designated the detected deceleration and sealed hydraulic pressure respectively at the time of full load conditions.

If the installation load of return spring 160 required to satisfy the function already described is Fr−ΔX·Kr, the hydraulic pressure rigidity of the control chamber is Φa, and the valve plunger 130 comes down for the distance ΔX such that the contact portion 135 is in liquid sealing engagement with valve seat 156, and the forces acting on valve plunger 130 maintain a state of equilibrium as a result, then the relationship between the hydraulic pressure sealed in the control chamber and the hydraulic pressure to be supplied to inlet 21 has to satisfy the following formulae under unloaded conditions and under full load conditions respectively.

$$Pfa \cdot Al = Pfa' \cdot Al + Fr + \Delta Ip \cdot Al \quad (5)$$

$$Pfb \cdot Al = Pfb' \cdot Al + Fr + \Delta Ip \cdot Al \quad (6)$$

From formulae (5) and (6):

$$Pfa - Pfa' = Pfb - Pfb' = \frac{Fr}{Al} + \frac{\Delta X \cdot Al}{\Phi a} = \text{constant} \quad (7)$$

In other words, the difference between the hydraulic starting proportioning reduction pressure and the sealed in hydraulic pressure in the situation wherein the proportioning reduction valve means 100 is in use, is constant irrespective of the load condition.

Point B" on line OU indicates the point at which the same deceleration as the unloaded detected deceleration can be generated by having hydraulic pressure Pfb" and Prb" corresponding to that point supplied to the front wheel brakes 9 and the rear wheel brakes 10 respectively, under full load conditions.

The following relationships exist between the hydraulic pressures Pfa' and Pra', which should be supplied to the front wheel brakes 9 and the rear wheel brakes 10 respectively, in order to generate, under unloaded conditions, the same deceleration as the deceleration that can be generated by hydraulic pressures Pfb" and Prb" corresponding to the aforementioned point B". (Pfb" > Pfa, Prb" > Pra').

In the load-responsive proportioning valve assembly 13 of the present invention, conditions are also arranged such that the hydraulic pressure Pfa' corresponding to the point A' under the unloaded condition, or the hydraulic pressure Pfb' corresponding to the point B' under the full load condition, is sealed in the control chamber of control means 500 by the operation of deceleration sensing means 300 and the sensed deceleration control means 400, and the hydraulic pressure Pfa corresponding to the point A is supplied to inlet 21 under unloaded conditions and the hydraulic pressure Pfb corresponding to the point B is supplied under full load conditions, and the proportioning-reducing operation is initiated when the fluid pressure supply increases beyond these values.

When equipping a motor vehicle with the load-responsive proportioning-reducing valve assembly 13 of the present invention, it is preferable to install the assembly in such a manner that its axial center line $X_1-X_1$ has an angle of elevation $\theta e$ with respect to the axis of forward progression of the vehicle in order to satisfy the following formula:

$$\theta_e = \tan^{-1} \cdot \beta_{GE} \quad (8)$$

The following explanations of the principles of operation of the valve assembly of the present invention is made on the basis of assuming that the device is installed in a vehicle at an inclination angle satisfying the conditions of formula (8).

The installation load Fce of the control spring 430 of sensed deceleration control means 400 is determined to meet the conditions satisfying the following formula.

$$Pfa' \cdot Ap = Fce \quad (9)$$

If this condition exists, as is clear from FIG. 9, when hydraulic pressures Pfa' and Pra' (where Pfa' = Pra') are supplied to the front and rear wheel brakes respectively under unloaded conditions, this hydraulic pressure Pfa' is supplied also to the deceleration sensing chamber 47 and the control chamber at the same time. This hydraulic pressure Pfa' acts on the effective pressure-receiving area Ap of the position controller piston 420 and tends to press the position controller piston 420 downwards with the hydraulic pressure force Pfa' · Ap. But the position controller piston 420 is anchored in its original position shown in FIG. 2 by the control spring 430, having the installation load Fce that satisfies formula (9) and does not move.

When hydraulic pressures Pfa' and Pra' are supplied to the front and rear wheel brakes respectively under unloaded conditions, deceleration $\beta_{GE}g$ is induced in the vehicle. When the position controller piston 420 is in the position shown in FIG. 2, the axial center $X_2-X_2$ coincides with the axial center $X_1-X_1$ of the load-responsive proportioning-reducing valve assembly 13. Axial center $X_1-X_1$ is installed in the vehicle to make an angle of elevation that satisfies formula (8) with respect to the axis of forward movement of the vehicle. In consequence, when hydraulic pressures Pfa' and Pra' are supplied to the front and rear wheel brakes respectively under unloaded conditions, the G-sensor 310 receives the deceleration $\beta_{GE}g$ in accordance with formula (8) and rolls forward up the incline into liquid-sealing engagement with the sensor seat 530 with a contact area As, sealing hydraulic pressure Pfa' in the control chamber.

The hydraulic pressure Pfa' sealed in the control chamber acts on the effective pressure-receiving area Al formed on the plunger valve 140 and induces hydraulic pressure force Pfa'·Al. This hydraulic pressure force Pfa'·Al, in cooperation with the installation load $Fr - \Delta X \cdot Kr$ of the return spring 160, presses the valve plunger 130 further upward. When the hydraulic pressure in the deceleration sensing chamber continues to increase, this liquid-sealing engagement of G-sensor 310 with sensor seat 530 becomes tighter, as that increased hydraulic pressure acts on the contact area As. As a result, the hydraulic pressure Pfa' sealed in the control chamber is maintained at its level even if the hydraulic pressure in the deceleration sensing chamber 47 increases.

When the hydraulic pressure in the control chamber is maintained in the above-mentioned condition and the hydraulic pressure supplied to the inlet 21 reaches Pfa, it acts on the effective pressure-receiving area Al of the plunger valve 130 and lowers the plunger valve 130 for the distance $\Delta X$ in accordance with the conditions already mentioned, and it stays in the position wherein the contact portion 135 is in liquid-sealing engagement with valve seat 156. The force that acts on the valve plunger 130 immediately before this liquid-sealing engagement keeps a state of equilibrium shown by formula (5).

The liquid-sealing engagement of contact portion 135 with valve seat 156 blocks the communication between first chamber 30 and the chamber 109 on the other side of the proportioning-reducing valve means 100 and forms an effective pressure-receiving area Au at the area of liquid-sealing engagement. If the hydraulic pressure established in chamber 109 or 106 at the time communication has been blocked by the first liquid-sealing engagement of contact portion 135 with valve seat 156 is Pra, the condition of equilibrium acting on the valve plunger 130 satisfies the following formula.

$$Pra \cdot Au = Pfa (Au - Al) + (Pfa' + \Delta IP) Al + Fr \quad (10)$$

Since the relationship between the hydraulic pressure established in chamber 30 and the hydraulic pressure in chamber 109 on the other side at the point of time of first liquid-sealing engagement of the contact portion 135 with the valve seat 156 is naturally Pfa = Pra, it follows that formula (5) = formula (10). When the hydraulic pressure supplied to inlet 21 further increases a very small amount ($\Delta Pf$) after the first liquid-sealing engagement is made, the forces acting on the valve plunger 130 from the liquid-sealing engagement condition between valve seat 156 and contact portion 135 come into a state of imbalance represented by the following formula.

$$\text{Pra} \cdot \text{Au} < (\text{Pfa} + \Delta\text{Pf})(\text{Au} - \text{Al}) + (\text{Pfa}' + \Delta\text{IP})\text{Al} + \text{Fr} \quad (11)$$

This force of imbalance pushes the valve plunger 130 upward, separates contact portion 135 from valve seat 156 and forms a very small liquid-passage between them.

If it is assumed that when hydraulic pressure ΔPr (which is a portion of the very small increment hydraulic pressure ΔPf supplied to inlet 21) has been transmitted to chamber 109 or 106 on the other side via the aforementioned very small liquid passage, contact portion 135 again comes into liquid-sealing engagement with valve seat 156 and the forces acting on valve plunger 130 come into a state of equilibrium, and then the following formula will be obtained.

$$(\text{Pfa} + \Delta\text{Pr})\text{Au} = (\text{Pfa} + \Delta\text{Pf})(\text{Au} - \text{Al}) + (\text{Pfa}' + \Delta\text{IP})\text{Al} + \text{Fr} \quad (12)$$

From formula (12) − formula (10), $$\Delta Pr = \Delta Pf \left(1 - \frac{Al}{Au}\right) \quad (13)$$

Au > Al; hence ΔPr > ΔPf

Formula (13) indicates that when the hydraulic pressure on the inlet 21 side continues increasing slightly after the first liquid-sealing engagement of the contact portion 135 with valve seat 156, valve seat 156 and contact portion 135 are separated out of liquid-sealing engagement by the increment hydraulic pressure and fluid with hydraulic pressure suppressed at a fixed ratio which satisfies the conditions of formula (13) is transmitted to the chamber 106 on the other side. The contact portion 135 is thus again brought into liquid-sealing engagement with valve seat 156. As a result of this, if the hydraulic pressure supplied to inlet 21 further continues to increase, the opening and closing of the passage between valve seat 156 and contact portion 135 are repeated oscillatorily, and when the very small increases in the hydraulic pressure supplied to inlet 21 are repeated continuously, fluid with hydraulic pressure repressed proportionately to satisfy formula (13) is transmitted continuously to the outlet 102. Consequently, if in formula (12)

Pra + ΔPr = Pre

Pfa + ΔPf = Pfe (Pfa' + ΔIP) Al + Fr = Ce, then this outlet pressure may be expressed as follows:

$$\text{Pre} \cdot \text{Au} = \text{Pfe} (\text{Au} - \text{Al}) + \text{Ce} \quad (14)$$

$$Pre = Pfe\left(1 - \frac{Al}{Au}\right) + \frac{Ce}{Au} \quad (14')$$

Formula (14) or formula (14') is a general formula showing the proportionate pressure reduction distribution line AC of FIG. 9 which the load-responsive proportioning-reducing valve device or assembly 13 of the present invention displays under unloaded conditions.

In order to have expected characteristics displayed under full load conditions as represented by formula (14) or (14') by valve assembly 13, which is provided with return spring 160 which satisfies the operating load Fr obtained from formula (7), that is, $$Fr = (Pfa - Pfa' - \frac{\Delta X \cdot Al}{\Phi a}) Al \quad (7')$$

$$+ (Pfa - Pfb' - \frac{\Delta X \cdot Al}{\Phi a}) Al$$

control spring 430 (which has an installation load Fce that satisfies formula (9) must have characteristic properties described hereinafter.

As is clear from FIG. 9, even if fluid under hydraulic pressure Pfa is supplied to deceleration sensing chamber 47 at the same time fluid under hydraulic pressure Pfa' and Pra' are supplied to the front and rear wheel brakes respectively by the braking operation under full load conditions, the position controller piston 420 does not come down from its original position, and in this condition cannot generate deceleration $\beta_{GE}\cdot g$ required for driving the G-sensor 310. Because of this, fluid under hydraulic pressure supplied to inlet 21 which continuously increases beyond Pfa' is transmitted into the control chamber. As was already mentioned, the hydraulic pressures to be supplied to the front and rear wheel brakes under full load conditions to produce deceleration which is equal to deceleration present upon unloaded detection are Pfb" and Prb", and these hydraulic pressures are such that Pfb" > Pfa' and Prb" > Pra. Quite naturally, this hydraulic pressure Pfb" is transmitted to the deceleration sensing chamber 47 and acts upon the effective pressure-receiving area Ap.

If it is assumed that the hydraulic pressure force and repulsion force come to a state of equilibrium when the hydraulic pressure force Pfb"·Al (induced by the action on the effective pressure-receiving area Ap) lowers the position controller piston 420 for the distance If' in defiance of the repulsion force of control spring 430 (which has a spring constant Kc), then the following formula will be established.

$$\text{Afb}' \cdot \text{Ap} = \text{Fce} + \text{Fc} \cdot \text{If}' \quad (15)$$

The amount of descent If' of the position controller piston 420, assumed to be caused by the action of hydraulic pressure Pfb", may be obtained as shown below by substitution of formula (9) in formula (15).

$$If' = \frac{Ap}{Kc}(Pfb'' - Pfa') \quad (16)$$

In formula (16), Pfb" and Pfa' are constants that can be determined from FIG. 9, and Ap is a constant determined in deciding the construction of this load-responsive proportioning-reducing valve assembly 13. The spring constant Kc of the control spring is a constant depending on the vehicle, which can be bound under conditions that will be described later. Consequently, If' is a constant which should be determined depending on the vehicle in which this load-responsive proportioning-reducing valve assembly 13 is to be used.

This descent of the position controller piston 420 causes the axis $X_2$—$X_2$ of sensor cage 301 to swing with respect to axis $X_1$—$X_1$ and angle θf' is formed therebetween and the relationship of the following formula exists between θf' and If'.

$$If = a \cdot \tan \theta f + Rc \left[ \frac{1}{\cos \theta f} - 1 \right] \quad (17)$$

As a result, the axis $X_2$—$X_2$ of sensor cage 301 has an angle of elevation $\theta_e + \theta f$ with respect to the axis of progression of the vehicle.

As is clear from formula (8), the relationship between this angle of elevation and the deceleration that has been generated at that time will be represented by the following formula of inequality.

$$\theta_e + \theta f > \tan^{-1} \cdot \beta_{GE}$$

Because of this, G-sensor 310 is not driven by the deceleration $\beta_{GE} \cdot g$ of the vehicle generated at that time, but stays stationary in its rest position.

When the hydraulic pressure is supplied to the front and rear wheel brakes and the deceleration sensing chamber 47 under full load conditions, phenomena similar to that of formula (17) and formula (18) continues until that hydraulic pressure moves on line OU of FIG. 9 from point B" to the proximity of point B' under conditions to be mentioned hereinafter. When the hydraulic pressure supplied to the front and rear wheel brakes and the deceleration sensing chamber 47 reaches the values Pfb' and Prb', which correspond to point " on the line OU, that hydraulic pressure induces in the vehicle a deceleration of $\beta_{GF} \cdot g (> \beta_{GE} \cdot g)$ and at the same time acts on the effective pressure receiving area Ap of position controller piston 420 and imposes on it hydraulic pressure force Pfb'·Ap.

If it is assumed that the hydraulic pressure force becomes balanced with the repulsion force when this hydraulic pressure force Pfb'·Ap makes the position controller piston 420 come down for the distance If in defiance of the repulsion force of the control spring which has a spring constant Kc, the following formula will be established.

$$Pfb' \cdot Ap = Fce + Kc \cdot If \quad (19)$$

By substitution of formula (9) in formula (19), the spring constant Kc of control spring 430 required for satisfying the above-mentioned assumption will be expressed as follows:

$$Kc = \frac{AP}{If} (Pfb' - Pfa') \quad (20)$$

The angle $\theta f$, which the center line $X_2$—$X_2$ of the sensor cage 301 has with respect to the horizontal in order to have the G-sensor 310 driven by the deceleration $\beta_{GF} \cdot g$ of the vehicle and get in fluid-sealing engagement with the sensor seat 530 to seal fluid pressure Pfb' in the control chamger 33, must satisfy the formula below:

$$\theta f = \tan^{-1} \beta_{GF} \quad (21)$$

In consequence, the center line $X_2$—$X_2$ of the sensor cage 301, which has this angle $\theta f$ with respect to the horizontal, has an angle $\theta f - \theta_e$ with respect to the axis $X_1$—$X_1$ of the load-responsive proportioning pressure reducing valve 13. When the device shown in the drawing is used, the amount of descent If of the position controller piston 420 for making the slope angle $\theta f - \theta_e$ of the center line $X_2$—$X_2$ with respect to the axis $X_1$—$X_1$ is determined by the formula below:

$$If = a \cdot \tan (\theta f - \theta_e) + Rc \left[ \frac{1}{\cos (\theta f - \theta_e)} - 1 \right] \quad (22)$$

As is clear from FIG. 9, $\beta_{GE}$ and $\beta_{GF}$ are constants depending on what proportioning-reducing distribution characteristic is set with respect to the ideal braking hydraulic pressure distribution curve of the vehicle into which the load-responsive reducing valve device 13 is to be installed. In consequence, the fluctuation angle $\theta f - \theta_e$ of the sensor cage 31 under full load conditions given by formula (21) is a constant. A and Rc in formula (22) are constants which are determined by the construction design of the load-responsive proportioning-reducing valve device 13. It is therefore possible to determine from formula (22) the amount of displacement If the position controller piston 420 should descend under full load conditions.

The spring constant Kc which control spring 430 should have in order to have position controller piston 420 perform the expected operation under full load conditions may be determined by substitution for formula (22) in formula (20) as follows:

$$Kc = \frac{Ap(Pfb' - Pfa')}{a \cdot \tan (\theta f - \theta_e) + Rc \left[ \frac{1}{\cos(\theta f - \theta_e)} - 1 \right]} \quad (20')$$

When hydraulic pressure Pfb' is sealed in the control chamber by the G-sensor 310 driven by the deceleration $\beta_{GF}$ of the vehicle (which is induced by the supply of hydraulic pressure Pfb' and Prb' to the front and rear wheel brakes respectively under full load condition), that hydraulic pressure acts on the effective pressure-receiving area al of the valve plunger 130 and produces hydraulic pressure force Pfb'·Al. This hydraulic pressure force Pfb'·Al pushes the valve plunger 130 upward in cooperation with the installation load Fr − ΔX·Kr of return spring 160. When the hydraulic pressure which is supplied to inlet 21 (while the hydraulic pressure in the control chamber is under the aforementioned conditions and the valve plunger 130 is in the condition of being held up) goes beyond Pfb' and reaches Pfb, it becomes the hydraulic pressure force Pfb·Al acting on the effective pressure receiving area Al and pushes the plunger 130 downward.

If it is assumed that this force Pfb·Al pushing the plunger 130 downward causes the plunger 130 to make a descent or ΔX, in accordance with the set conditions already mentioned, and that the plunger becomes balanced with the force pushing it upward, then the following formula will be established.

$$Pfb \cdot Al = (Pfb' + \Delta Ip) Al + Fr \quad (6')$$

The liquid-sealing engagement of valve seat 156 and contact portion 135 blocks the communication between the chamber 30 on one side and the chamber 106 on the other side of the proportioning-reducing valve means 100 and forms an effective pressure-receiving area Au at the location of the liquid-sealing engagement. If the hydraulic pressure established in the chamber 109 or 106 on the other side, at the time communication is blocked by the first liquid-sealing engagement of the contact portion 135 with the valve seat 156, is Prb, then the force acting on plunger 130 must satisfy the following conditions of equilibrium.

$$Prb \cdot Au = Pfb(Au - Al) + (Pfb' + \Delta IP)Al + Fr \quad (23)$$

The relationship between the hydraulic pressures established in chamber 30 on one side and in chamber 109 on the other side, at the time of the first liquid-sealing engagement of the contact portion 135 with the valve seat 156, is naturally Pfb − Prf. Hence, formula (6) = formula (23). When the hydraulic pressure supplied to the inlet further is increased a very small amount ΔPf after the first liquid-sealing engagement, the forces acting on the plunger 130 come into a condition of imbalance represented by the formula below because of the conditions for liquid-sealing engagement between valve seat 156 and contact portion 135.

$$Prb \cdot Au > (Pfb + \Delta Pf)(Au - Al) + (Pfb' + \Delta IP)Al + Fr \quad (24)$$

This imbalance pushes plunger 130 upward and pulls contact portion 135 away from the valve seat 156, forming a very small liquid-passage between the two.

If it is assumed that when hydraulic pressure ΔPr (which is a part of the very small increase ΔPf of hydraulic pressure supplied to the inlet 21) has been transmitted to the chamber 106 on the other side through the aforementioned very small liquid-passage, the contact portion 135 again comes into liquid-sealing engagement with valve seal 156 and the forces acting on plunger 130 comes into a state of equilibrium, and the following formula is obtained.

$$(Prb + \Delta Pr) = (Pfb + \Delta Pf)(Au - Al) + (Pfb' + \Delta IP)Al + Fr \quad (25)$$

From formula (25)–(23), $$\Delta Pr = \Delta Pf(1 - \frac{Al}{Au}) \quad (26)$$

Au > Al, hence ΔPr < ΔPf

Formula (26) indicates that when the hydraulic pressure on inlet 21 side continues to slightly increase after the first liquid-sealing engagement of contact portion 135 with valve seat 156, the liquid-sealing engagement of valve seat 156 and contact portion 135 is broken by that increased hydraulic pressure, and the hydraulic pressure repressed at a fixed ratio that satisfies the conditions of formula (26) is transmitted to the chamber 106 on the other side, thereby making contact portion 135 again come into liquid-sealing contact with valve seat 156. When the hydraulic pressure supplied to inlet 21 further continues to increase, therefore, opening and closing contact between valve seat 156 and contact portion 135 is repeated oscillatorily. Thus, when the slight increase of hydraulic pressure supplied to inlet 21 is continuously repeated, hydraulic pressure which is proportionately repressed to satisfy formula (26) is continuously supplied to outlet 102.

Therefore, if in formula (25)

$$Prb + \Delta Pr = Prf$$

$$Pfb + \Delta Pf = Pff$$

$$(Pfb' + \Delta IP)Al + Fr = Cf,$$

then the following expressions will be obtained:

$$Prf \cdot Au = Pff(Au - Al) + Cf \quad (27)$$

$$Prf = Pff(1 - \frac{Al}{Au}) + \frac{Cf}{Au} \quad (27')$$

Formula (27) or formula (27') is a general formula representing the proportionate pressure reduction distribution line BD of FIG. 9, which is displayed by the load-responsive proportioning-reducing valve device 13 according to the present invention under full load conditions.

Ap, Al, Au, a, Rc, Fr, Kr and ΔX mentioned in the foregoing description are constants which should be reasonably determined in making construction design of the load-responsive proportioning-reducing valve 13 according to the present invention. Pfa', Pfa, Pfb', Pfb, $\beta_{GE}$ and $\beta_{GF}$ are constants which can suitably be determined on the basis of the relationship of the ordinary braking hydraulic pressure distribution line OU with the unloaded ideal braking hydraulic pressure distribution curve OAE and full load ideal braking hydraulic pressure distribution curve OFB, respectively, which are obtained theoretically from various factors of the vehicle in which this loadresponsive pressure proportioning-reducing valve device 13 is to be used.

In order to have this valve device assembly 13 display the proportioning-reducing characteristic AE at the time of unloaded conditions and the proportioning-reducing characteristic BD at the time of full load conditions on the basis of these constants, the angle $\theta_e$ of installation in the vehicle can be determined from formula (8), the installation load Fce of the control spring 430 from formula (9), the spring constant Kc of the control spring 430 from formula (20'), and the stroke limit lf of the position controller piston 420 from formula (21) and formula (22'). By virtue of these determinations, the valve assembly 13 will display the proportioning reducing characteristics represented by formula (14) at the time of unloaded conditions and that represented by formula (27) at the time of full load conditions.

It is evident that the valve device or assembly 13, which is so set as to display proportioning pressure reduction distributing characteristics which approximate the ideal braking hydraulic pressure distribution curves for the time of unloaded condition and the time of full load condition respectively, can display a proportioning pressure reduction distribution characteristic which substantially approximates the ideal braking hydraulic pressure distribution curve for the existance of any load condition between the unloaded and full load conditions.

The relationship shown in FIG. 9 wherein the proportioning reducing operation starting points A and B (the points at which the load-responsive proportioningreducing valve device 13 beings operating) are determined at the intersections of the ideal braking hydraulic pressure distribution curves for unloaded conditions and full load with the ordinary braking hydraulic pressure distribution line. These points can easily be moved to the higher pressure side or to the lower pressure side from the points on line OU by suitably determining the angle $\theta_e$ of installation of valve assembly 13 in the vehicle and the characteristics of control spring 430. This fact is evident from formulae (8), (9), (20), (21) and (22).

It is also possible to make determinations so as to make the gradient of the proportioning pressure reduction distribution line displayed by this valve assembly 13 approximately coincide with the ideal braking hydraulic pressure distribution curve. This can be done by the determination of the values for the two effective pressure-receiving areas Au and Al to be made during design and construction of the plunger 130 and members related thereto. This fact is obvious from formula (13).

The proportioning-reducing valve means 100 used in the load-responsive proportioning-reducing valve device 13 shown in FIG. 2 is only an example embodiment of application. It can be combined with or substituted by any suitable movable valve means or restricting valve means which is capable of operation upon receipt of a specific hydraulic pressure which varies correspondingly to the load condition of the vehicle. Such combinations or substitutions are considered to be within the scope of the following claims.

With respect to formulae (1), (9), (15), (16), (19), (20) and (20') in the foregoing description, it is assumed that the force that pushes the position controller piston 420 downward in defiance of the repulsion force of control spring 430 is only the hydraulic pressure force induced by the hydraulic pressure supplied to the deceleration sensing chamber 47. The force due to the sensor cage 301 having a downward action on the $Z_1 - Z_1$ axis and the weight in liquid of the G-sensor 310, and the repulsion force of the retaining spring 220 which acts via the cage retainer 230 are forces considered, in making these expressions, to be values that are small enough to be ignored for calculations when compared with the repulsion force of the control spring 430.

The characteristics of retaining spring 220, like the characteristics of return spring 160 which has already been mentioned, is a constant which is fundamentally decided by the construction design of the valve assembly 13, and is not variably dependent upon the characteristics of the vehicle in which this device is to be used, as is the case for the characteristics of control spring 430. Consequently, even if the installation load Fh of retaining spring 220, which has a spring constant Kh, for instance, is such that Kc >> Kh, Fce >> Fhe, or in a case where it is determined at this value that cannot be ignored, the objects of the present invention can be achieved by modifying the aforementioned formulae that relate the requisite amount of displacement of the position controller piston 420 to each condition of hydraulic pressure to be established in the deceleration sensing chamber 47. That is to say, if the amount of descent of cage retainer 230 under conditions where formula (1) was established is si, then the following formula will be established.

$$Pfi \cdot Ap = (Fce - Fhe) + (Kc \cdot Ii + Kh \, si) \quad (1')$$

The conditions for equillibrium correspond to that under the condition in which formula (9) is established is obtained from the following formula.

$$Fce = Pfa' \cdot Ap - Fhe \quad (9')$$

If the amount of descent of the cage retainer 230 under the condition in which formula (15) is established is sf', then the following formula is established:

$$Pfb'' \cdot Ap = (Fce - Fhe) + (Kc \cdot If + Kh \cdot sf') \quad (15')$$

The condition of equilibrium corresponding to that under the condition in which formula (16) is established is obtained from the following formulae.

$$If = \frac{Ap}{Kc} (Pfb'' - Pfa') - \frac{Kh}{Kc} sf' \quad (16)$$

$$If = a \cdot \tan \theta f + Rc \left[ \frac{1}{\cos \theta f} - 1 \right] \quad (17)$$

$$sf = a \cdot \tan \theta f - Rc \left[ \frac{1}{\cos \theta f} - 1 \right] \quad (17')$$

If the amount of descent of cage retainer 230 under the condition in which formula (19) is established is sf, then the following formula is established.

$$Pfb' \cdot Ap = (Fce - Fhe) + (Kc \cdot If + Kh \cdot sf) \quad (19')$$

The condition of equilibrium corresponding to that under the condition wherein formula (20) is established is obtained from the following formulae.

$$Kc - \frac{Ap}{If} (Pfb' - Pfa') - Kh \frac{sf}{If} \quad (20')$$

$$If = a \cdot \tan (\theta f - \theta_e) + Rc \left[ \frac{1}{\cos (\theta f - \theta e)} - 1 \right] \quad (22)$$

$$sf = a \cdot \tan (\theta f - \theta_e) - Rc \left[ \frac{1}{\cos (\theta f - \theta_e)} - 1 \right] \quad (22')$$

From the relationship between formulae (22), (22') and (20'), spring constant Kc of the control spring which satisfies this condition is determined as follows:

$$Kc = \frac{Ap (Pfb' - Pfa')}{a \cdot \tan (\theta f - \theta_e) + Rc \{1/\cos (\theta f - \theta_e) - 1\}}$$

$$- Kh \frac{a \cdot \tan (\theta f - \theta_e) - Rc \{1/\cos (\theta f - \theta_e) - 1\}}{a \cdot \tan (\theta f - \theta_e) + Rc \{1/\cos (\theta f - \theta_e) - 1\}} \quad (20'')$$

In addition to Ap, Al, Au, a, Fr, Kr and ΔX which have already been discussed, Fhe and Kh are constants which should be reasonably decided in making the construction design of the load-responsive proportioning-reducing valve assembly 13, and Pfa', Pfa, Pfb', Pfb, $\beta_{GE}$ and $\beta_{GF}$ are constants which can be suitably determined on the basis of the relationship of the ordinary braking hydraulic pressure distribution line with each unloaded ideal braking hydraulic pressure distribution curve OAE and the full load ideal braking hydraulic pressure distribution curve OBF, which are theoretically obtainable from the various factors of the installation vehicle.

In order to have this load-responsive proportioning-reducing valve assembly 13 with these constants display the proportioning-reducing property AE under unloaded conditions and the proportioning-reducing property BD under full load conditions, the angle $\theta_e$ of installation in the vehicle can be determined from formula (8), the installation load Fce of the control spring 430 from formula (9'), the spring constant Kc of control spring 430 from formula (20''), and the stroke limit 1f of the position controller 420 from formula (21) and formula (22).

Furthermore, in case the force due to the sensor cage 301 acting on the axis $Z_1 - Z_1$ and the weight in liquid of the G-sensor has a value which cannot be ignored in comparison with the repulsion force of control spring 430, it is obvious that a satisfactory determination can be made by modifying the installation load Fce and spring constant Kc which the control spring 430 should possess to have the position controller piston 420 display a requisite amount of displacement to correspond to each hydraulic pressure condition established in the decleration sensing chamber 47. This can be done by employing a technique similar to that already described with respect to the influence of the force of action of the retaining spring 220.

I claim:

1. A load-responsive pressure reducing valve assembly for hydraulic brake systems adapted to be interposed between a fluid motor and at least one brake cylinder of a wheeled vehicle including fluid pressure proportioning valve means for restricting the flow of fluid from a fluid inlet to a fluid outlet during a predetermined range of increasing fluid pressure at said outlet and deceleration sensing means including an inertiaresponsive member responsive to a predetermined rate of deceleration of the assembly to travel a predetermined distance up an incline to cause said deceleration sensing means to thereby set the starting pressure of said predetermined range of increasing fluid pressure, means to pivot said incline to steeper angles of inclination during a predetermined range of increasing fluid pressure at said inlet, said means to pivot said incline including a cage providing said incline therein and positioned on an angle of inclination for longitudinal movement in said cage of said inertia-responsive member up said incline from a stop, said cage pivoted for pivotal movement about an axis horizontally transverse to said incline, and cage position controller means supporting said cage at said angle of inclination and displaceable within said predetermined range of increasing fluid pressure from said inlet to pivot said cage to an angle of steeper inclination, said cage position controller means including a piston biased against a stop and supporting said cage from downward pivotal movement about said axis, said piston displaceable against its bias by fluid under pressure within said predetermined range from said inlet to pivot said cage to said angle of steeper inclination, including holding means continually urging said cage into following support engagement with said piston.

2. A load-responsive pressure reducing valve assembly for hydraulic brake systems adapted to be interposed between a fluid motor and at least one brake cylinder of a wheeled vehicle including fluid pressure proportioning valve means for restricting the flow of fluid from a fluid inlet to a fluid outlet during a predetermined range of increasing fluid pressure at said outlet and deceleration sensing means including a spherical inertia-responsive member responsive to a predetermined rate of deceleration of the assembly to travel a predetermined distance up an incline to cause said deceleration sensing means to thereby set the starting pressure of said predetermined range of increasing fluid pressure, means to pivot said incline to steeper angles of inclination during a predetermined range of increasing fluid pressure at said inlet, said means to pivot said incline including a cage providing said incline therein and positioned on an angle of inclination for longitudinal movement in said cage of said inertia-responsive member up said incline from a stop, said cage pivoted for pivotal movement about an axis horizontally transverse to said incline, and cage position controller means supporting said cage at said angle of inclination and displaceable within said predetermined range of increasing fluid pressure from said inlet to pivot said cage to an angle of steeper inclination, an annular valve seat for seating engagement by said spherical inertia-responsive member upon traveling said predetermined distance up said incline to thereby close a fluid orifice to set said starting pressure, wherein the said pivot axis of said cage passes through the center of said spherical inertia-responsive member when the latter is engaged with said annular valve seat.

3. A load-responsive pressure reducing valve assembly for hydraulic brake systems adapted to be interposed between a fluid motor and at least one brake cylinder of a wheeled vehicle including fluid pressure proportioning valve means for restricting the flow of fluid from a fluid inlet to a fluid outlet during a predetermined range of increasing fluid pressure at said outlet and deceleration sensing means including an inertia-responsive member responsive to a predetermined rate of deceleration of the assembly to travel a predetermined distance up an incline to cause said deceleration sensing means to thereby set the starting pressure of said predetermined range of increasing fluid pressure, said deceleration control means including a position controller piston biased against a stop, said piston displaceable against its bias by fluid under predetermined pressure from said inlet acting on an effective pressure receiving area thereof to thereby increase the angle of inclination of said incline, the effective receiving area of said piston slidably received in a sealing member such that no other areas of said piston which would effectively oppose said effective receiving area are subjected to the fluid under predetermined pressure.

4. A load-responsive pressure reducing valve assembly for hydraulic brake systems adapted to be interposed between a fluid motor and at least one brake cylinder of a wheeled vehicle, comprising: a fluid pressure proportioning valve including a housing having an inlet, an outlet, and a first chamber providing communication between said inlet and said outlet, and a pressure-responsive member disposed in said chamber and having a valve head cooperable with a valve seat member for restricting the flow of fluid from said inlet to said outlet through said valve seat member during a predetermined range of increasing fluid pressure at said outlet; said pressure-responsive member having a portion thereof exposed to a second chamber in said housing through a fluid seal from said first chamber for biasing said pressure-responsive member to a position establishing said communication between said inlet and said outlet by fluid under pressure in said second chamber and thereby control the reduction starting pressure of said predetermined range of increasing fluid pressure; a deceleration sensing valve including an inertia-responsive valve member responsive to a predetermined rate of deceleration of the assembly to move a predetermined distance up an incline in a third chamber in said housing communicating through a passage with said first chamber to close a normally open passage of fluid from said third chamber to said second chamber, means to pivot said incline to steeper angles of inclination during a predetermined range of increasing fluid pressure in said third chamber, said means to pivot said incline including a cage providing said incline therein and positioned on an angle of inclination for longitudinal movement of said cage of said inertia-responsive member up said incline from a stop, said cage pivoted for pivotal movement about an axis horizontally transverse to said incline, and cage position controller means supporting said cage at said angle of inclination and displaceable within said predetermined range of increasing fluid pressure from said inlet to pivot said cage to an angle of steeper inclination, said cage position controller means including a piston biased against a stop and supporting said cage from downward pivotal movement about said axis, said piston displaceable against its bias by fluid under pressure within said predetermined range from said inlet to pivot said cage to said angle of steeper inclination, holding means continually urging said cage into following support engagement with said piston.

5. A load-responsive pressure reducing valve assembly for hydraulic brake systems adapted to be interposed between a fluid motor and at least one brake cylinder of a wheeled vehicle, comprising: a fluid pressure proportioning valve including a housing having an inlet, an outlet, and a first chamber providing communication between said inlet and said outlet, and a pressure-responsive member disposed in said chamber and having a valve head cooperable with a valve seat member for restricting the flow of fluid from said inlet to said outlet through said valve seat member during a predetermined range of increasing fluid pressure at said outlet; said pressure-responsive member having a portion thereof exposed to a second chamber in said housing through a fluid seal from said first chamber for biasing said pressure-responsive member to a position establishing said communication between said inlet and said outlet by fluid under pressure in said second chamber and thereby control the reduction starting pressure of said predetermined range of increasing fluid pressure; a deceleration sensing valve including a spherical inertia-responsive valve member responsive to a predetermined rate of deceleration of the assembly to move a predetermined distance up an incline to a third chamber in said housing communicating through a passage with said first chamber to close a normally open passage of fluid from said third chamber to said second chamber, means to pivot said incline to steeper angles of inclination during a predetermined range of increasing fluid pressure in said third chamber, said means to pivot said incline including a cage providing said incline therein and positioned on an angle of inclination for longitudinal movement in said cage of said inertia-responsive member up said incline from a stop, said cage pivoted for pivotal movement about an axis horizontally transverse to said incline, and cage position controller means supporting said cage at said angle of inclination and displaceable within said predetermined range of increasing fluid pressure from said inlet to pivot said cage to an angle of steeper inclination, an annular valve seat for seating engagement by said spherical inertia-responsive member upon moving said predetermined distance up said incline to close said passage of fluid to said second chamber, said pivot axis of said cage passes through the center of said spherical inertia-responsive member when the latter is engaged with said annular valve seat.

6. The load-responsive pressure reducing valve assembly of claim 5, including pressure absorbing means in said second chamber which enables said second chamber to expand to compensate for an incremental pressure increase created therein due to the closure of said passage to said second chamber by said spherical inertia-responsive member.

7. The load-responsive pressure reducing valve assembly of claim 6, wherein said pressure absorbing means consists of a high molecular elastic member exposed on one side to an air chamber and on the other side thereof to said second chamber.

8. A load-responsive pressure reducing valve assembly for hydraulic brake systems adapted to be interposed between a fluid motor and at least one brake cylinder of a wheeled vehicle, comprising: a fluid pressure proportioning valve including a housing having an inlet, an outlet, and a first chamber providing communication between said inlet and said outlet, and a pressure-responsive member disposed in said chamber and having a valve head cooperable with a valve seat member for restricting the flow of fluid from said inlet to said outlet through said valve seat member during a predetermined range of increasing fluid pressure at said outlet; said pressure-responsive member having a portion thereof exposed to a second chamber in said housing through a fluid seal from said first chamber for biasing said pressure-responsive member to a position establishing said communication between said inlet and said outlet by fluid under pressure in said second chamber and thereby control the reduction starting pressure of said predetermined range of increasing fluid pressure; a deceleration sensing valve including an inertia-responsive valve member responsive to a predetermined rate of deceleration of the assembly to move a predetermined distance up an incline in a third chamber in said housing communicating through a passage with said first chamber to close a normally open passage of fluid from said third chamber to said second chamber, deceleration control means for increasing the angle of inclination of said incline during a predetermined range of increasing fluid pressure in said third chamber, and an orifice as a portion of said fluid passage between said first and third chamber restricting the fluid flow therethrough such that the rate of increase of hydraulic pressure established in said third chamber is delayed in proportion to the rate of increase of hydraulic pressure supplied to said first chamber.

9. A load-responsive pressure reducing valve assembly for hydraulic brake systems adapted to be interposed between a fluid motor and at least one brake cylinder of a wheeled vehicle, comprising: a fluid pressure proportioning valve including a housing having an inlet, an outlet, and a first chamber providing communication between said inlet and said outlet, and a pressure-responsive member disposed in said chamber and having a valve head cooperable with a valve seat member for restricting the flow of fluid from said inlet to said outlet through said valve seat member during a predetermined range of increasing fluid pressure at said outlet; said pressure-responsive member having a portion thereof exposed to a second chamber in said housing through a fluid seal from said first chamber for biasing said pressure-responsive member to a position establishing said communication between said inlet and said outlet by fluid under pressure in said second chamber and thereby control the reduction starting pressure of said predetermined range of increasing fluid pressure; a deceleration sensing valve including an inertia-responsive valve member responsive to a predetermined rate of deceleration of the assembly to move a predetermined distance up an incline in a third chamber in said housing communicating through a passage with said first chamber to close a normally open passage of fluid from said third chamber to said second chamber; deceleration control means for increasing the angle of inclination of said incline during a predetermined range of increasing fluid pressure in said third chamber; and an orifice as a portion of said fluid passage between said second and third chambers restricting the fluid flow therethrough such that the rate of increase of hydraulic pressure established in said second chamber is delayed in proportion to the rate of increase of hydraulic pressure supplied to said third chamber.

10. A fluid pressure regulating device for a motor vehicle hydraulic braking system including a master cylinder and at least one wheel cylinder, comprising a housing body having formed therein first, second and third cavities, first and second fluid inlet ports to be supplied from a master cylinder and opened respectively to said first and third cavities and a fluid outlet port leading from said first cavity to supply at least one wheel cylinder, a plunger axially moveable in said first cavity and extending toward said second cavity, said plunger having a valve head which is cooperable with a valve seat to selectively establish and interrupt communication between said first fluid inlet port and said fluid outlet port as said plunger is axially moved, a preload spring accommodated in said housing for biasing said plunger to a position establishing communication between said first inlet port and said outlet port, said plunger exposed at one end to said second cavity through a slide fluid seal from said first cavity for biasing said plunger to a position establishing communication between said first inlet port and said outlet port by fluid under pressure in said second cavity, said second cavity being in communication with said third cavity, an annular valve seat member mounted in said third cavity and having an aperture providing said communication between said second and third cavities, a spherical inertia-responsive valve member received within a cylindrical cage open at one end and positioned in said third cavity on an incline for longitudinal movement of said valve member therein from a stop up the incline of said cage to mate said valve seat member and thereby close said aperture in response to a predetermined rate of deceleration of said housing, said cage pivoted in said third cavity for pivotal movement on an axis horizontally transverse to said incline and to the direction of forward progression of a vehicle in which said housing is to be mounted with said open end of said cage facing forward, a fourth cavity formed in said housing and communicating with said third cavity, a piston axially slidable in a fluid sealed relationship in said fourth cavity, a preload spring mounted in said fourth cavity and biasing said piston toward said third cavity, a stop limiting the maximum movement of said piston toward said third cavity, an end of said piston slidably exposed to said third cavity through a fluid seal and supporting said cage from pivoting to angles of steeper inclination about its pivot, said piston displaceable into said fourth cavity during a predetermined range of increasing fluid pressure in said third cavity to thereby pivotally increase the angle of inclination of said cage, only the effective pressure receiving area of said piston received through said fluid seal being exposed for subjection to said predetermined range of increasing fluid pressure in said third cavity.

11. The fluid regulating device of claim 10, including holding means continually urging said cage into following support engagement with said piston.

12. The fluid regulating device of claim 10, wherein the said pivot axis of said cage passes through the center of said spherical inertia-responsive member when the latter is engaged with said annular valve seat.

13. The fluid regulating device of claim 10, including pressure absorbing means in said second cavity which enables said second cavity to expand to compensate for an incremental pressure increase created therein due to the closure of said passage to said second cavity by said spherical inertia-responsive member.

14. The fluid regulating device of claim 13, wherein said pressure absorbing means consists of a high molecular elastic member exposed on one side to an air chamber and on the other side thereof to said second cavity.

15. The fluid regulating device of claim 10, including an orifice as a portion of said fluid passage between said first and third cavities restricting the fluid flow therethrough such that the rate of increase of hydraulic pressure established in said third cavity is delayed in proportion to the rate of increase of hydraulic pressure supplied to said first cavity.

16. The fluid regulating device of claim 10, including an orifice as a portion of said fluid passage between said second and third cavities restricting the fluid flow therethrough such that the rate of increase of hydraulic pressure established in said second cavity is delayed in proportion to the rate of increase of hydraulic pressure supplied to said third cavity.

17. A load-responsive pressure reducing valve assembly comprising fluid pressure proportioning means for restricting the flow of fluid from a fluid inlet to a fluid outlet during a predetermined range of increasing fluid pressure at said outlet and deceleration sensing means including an inertia-responsive member responsive to a predetermined rate of deceleration of the assembly to move a predetermined distance from a stop to thereby set the starting pressure of said predetermined range of increasing fluid pressure, and a piston having only one effective pressure receiving area slidably received through a fluid seal and subjected to fluid under a predetermined pressure from said inlet to displace said piston against a bias and thereby act on said inertia-responsive member to increase the deceleration of the assembly to be sensed.

18. The load-responsive pressure reducing valve assembly of claim 17 wherein said inertia-responsive member moves from said stop said predetermined distance up an incline and including means to steepen the angle of said incline with the displacement of said piston.

* * * * *